United States Patent
Turgeon et al.

(10) Patent No.: US 10,075,242 B2
(45) Date of Patent: Sep. 11, 2018

(54) HIGH THROUGHPUT SATELLITE SYSTEM WITH OPTICAL FEEDER UPLINK BEAMS AND RF SERVICE DOWNLINK BEAMS

(71) Applicant: Space Systems/Loral, LLC, Palo Alto, CA (US)

(72) Inventors: Ghislain Turgeon, San Jose, CA (US); Vijaya Gallagher, Palo Alto, CA (US); Leah Wang, Fremont, CA (US)

(73) Assignee: SPACE SYSTEMS/LORAL, LLC, Palo Alto, CA (US)

( * ) Notice: Subject to any disclaimer, the term of this patent is extended or adjusted under 35 U.S.C. 154(b) by 0 days.

(21) Appl. No.: 15/394,512

(22) Filed: Dec. 29, 2016

(65) Prior Publication Data

US 2017/0366262 A1  Dec. 21, 2017

Related U.S. Application Data

(60) Provisional application No. 62/350,297, filed on Jun. 15, 2016.

(51) Int. Cl.
   *H04J 14/02* (2006.01)
   *H04B 10/118* (2013.01)
   *H04B 7/185* (2006.01)

(52) U.S. Cl.
   CPC ......... *H04B 10/118* (2013.01); *H04B 7/1858* (2013.01); *H04B 7/18513* (2013.01); *H04B 7/18517* (2013.01); *H04J 14/0221* (2013.01)

(58) Field of Classification Search
   CPC ............. H04B 10/118; H04B 7/18513; H04B 7/18517; H04B 7/1858; H04J 14/0221
   (Continued)

(56) References Cited

U.S. PATENT DOCUMENTS

| 5,966,371 A * | 10/1999 | Sherman ............ H04B 7/18513 370/320 |
| 8,135,338 B1 | 3/2012 | Gelon et al. |
| 9,742,488 B2 | 8/2017 | Ling et al. |
| 2005/0100339 A1 | 5/2005 | Tegge, Jr. |
| 2009/0202254 A1 | 8/2009 | Majumdar et al. |
| 2012/0328298 A1* | 12/2012 | Yi ........................ H01Q 3/2676 398/96 |

(Continued)

OTHER PUBLICATIONS

Mato-Calvo et al., "Optical Feeder Links for Very High Throughput Satellites—System Perspectives", Proceedings of the Ka and Broadband Communications, Navigation and Earth Observation Conference 2015, Ka Conference 2015, Oct. 12-14, 2015, Bologna, Italy.*

(Continued)

*Primary Examiner* — M. R. Sedighian
(74) *Attorney, Agent, or Firm* — Vierra Magen Marcus LLP

(57) ABSTRACT

Described herein are ground based subsystems, and related methods, for use in transmitting an optical feeder uplink beam to a satellite that is configured to receive the optical feeder uplink beam and in dependence thereon produce and transmit a plurality of RF service downlink beams within a specified RF frequency range to service terminals. Also described herein are space based subsystems of a satellite, and related methods, for use in transmitting a plurality of RF service downlink beams within a specified RF frequency range to service terminals. Beneficially certain embodiments eliminate the need for any frequency down-converters or any other type of frequency conversion equipment in a space segment forward link equipment. Also described herein is space segment return link equipment, and related methods, for use in transmitting an optical feeder downlink beam to a ground based subsystem, as well as ground based return link equipment thereof.

25 Claims, 11 Drawing Sheets

(58) Field of Classification Search
USPC .......................................................... 398/96
See application file for complete search history.

(56) References Cited

U.S. PATENT DOCUMENTS

| | | |
|---|---|---|
| 2014/0362875 A1 | 12/2014 | Le Kernec et al. |
| 2016/0204866 A1 | 7/2016 | Boroson et al. |
| 2017/0214462 A1 | 7/2017 | Busche et al. |
| 2017/0288769 A1 | 10/2017 | Miller et al. |
| 2018/0041275 A1 | 2/2018 | Gallagher et al. |
| 2018/0054251 A1 | 2/2018 | Alex |
| 2018/0083678 A1 | 3/2018 | Alexander et al. |

OTHER PUBLICATIONS

U.S. Appl. No. 15/394,602, filed Dec. 29, 2016.
Mato-Calvo et al., "Optical Feeder Links for Very High Throughput Satellites—System Perspectives", Proceeding of the Ka and Broadband Communications, Navigation and Earth Observation Conference 2015, Ka Conference 2015, Oct. 12-14, 2015, Bologna, Italy.
Notice of Allowance dated Oct. 30, 2017, in U.S. Appl. No. 15/394,602, filed Dec. 29, 2016.
Amendment dated Jan. 18, 2018, in U.S. Appl. No. 15/461,372, filed Mar. 16, 2017.
Amendment dated Jan. 18, 2018, in U.S. Appl. No. 15/461,369, filed Mar. 16, 2017.
Amendment dated Jan. 26, 2018, in U.S. Appl. No. 15/394,602, filed Dec. 29, 2016.
Notice of Allowance dated Apr. 18, 2018, in U.S. Appl. No. 15/461,372, filed Mar. 16, 2017.
Notice of Allowance dated Apr. 9, 2018, in U.S. Appl. No. 15/461,369, filed Mar. 16, 2017.
312 Amendment dated Apr. 10, 2018, in U.S. Appl. No. 15/461,369, filed Mar. 16, 2017.
Notice of Allowance dated May 8, 2018, in U.S. Appl. No. 15/599,852, filed May 19, 2017.
Ex Parte Quayle Action dated May 30, 2018, in U.S. Appl. No. 15/682,785, filed Aug. 22, 2017.

* cited by examiner

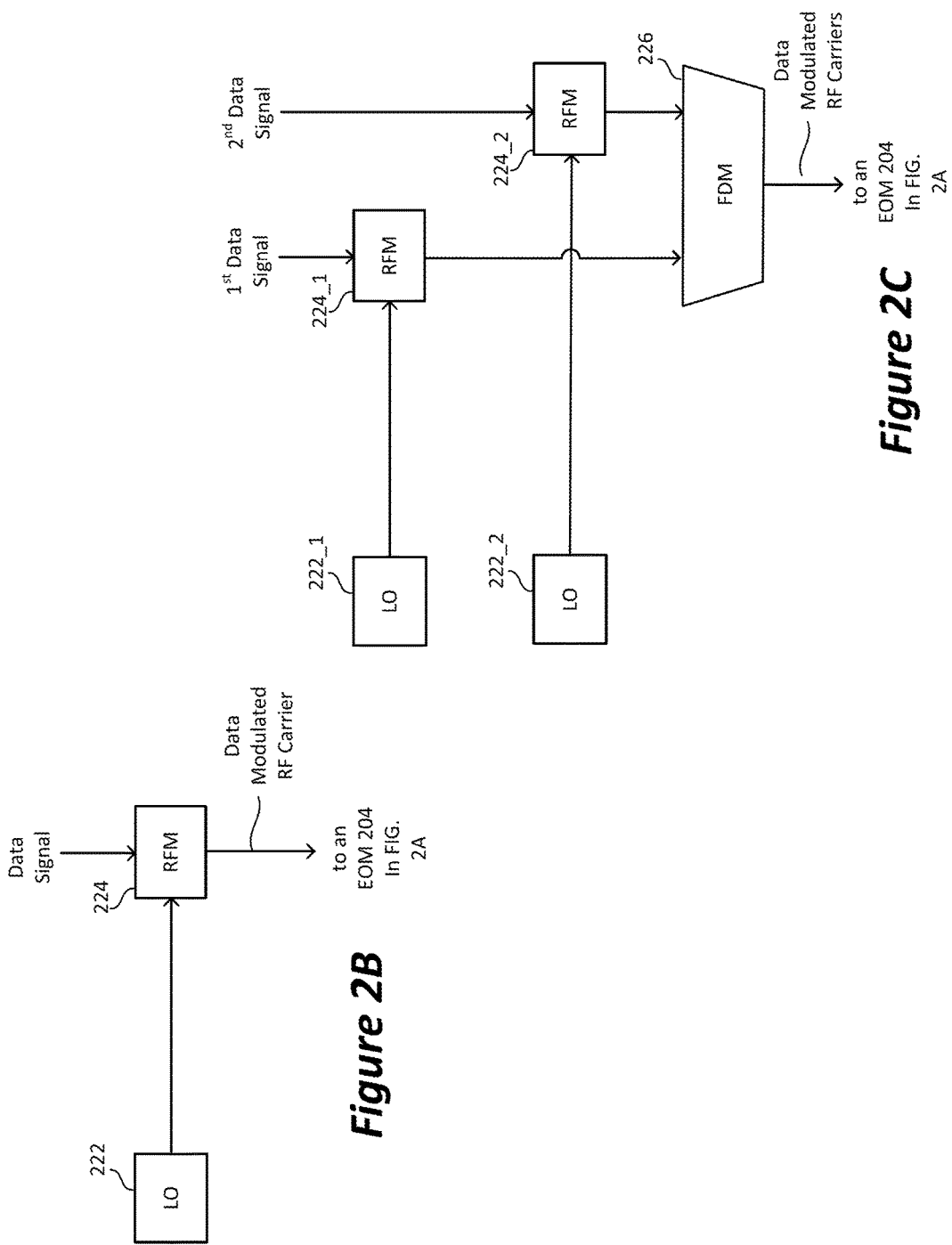

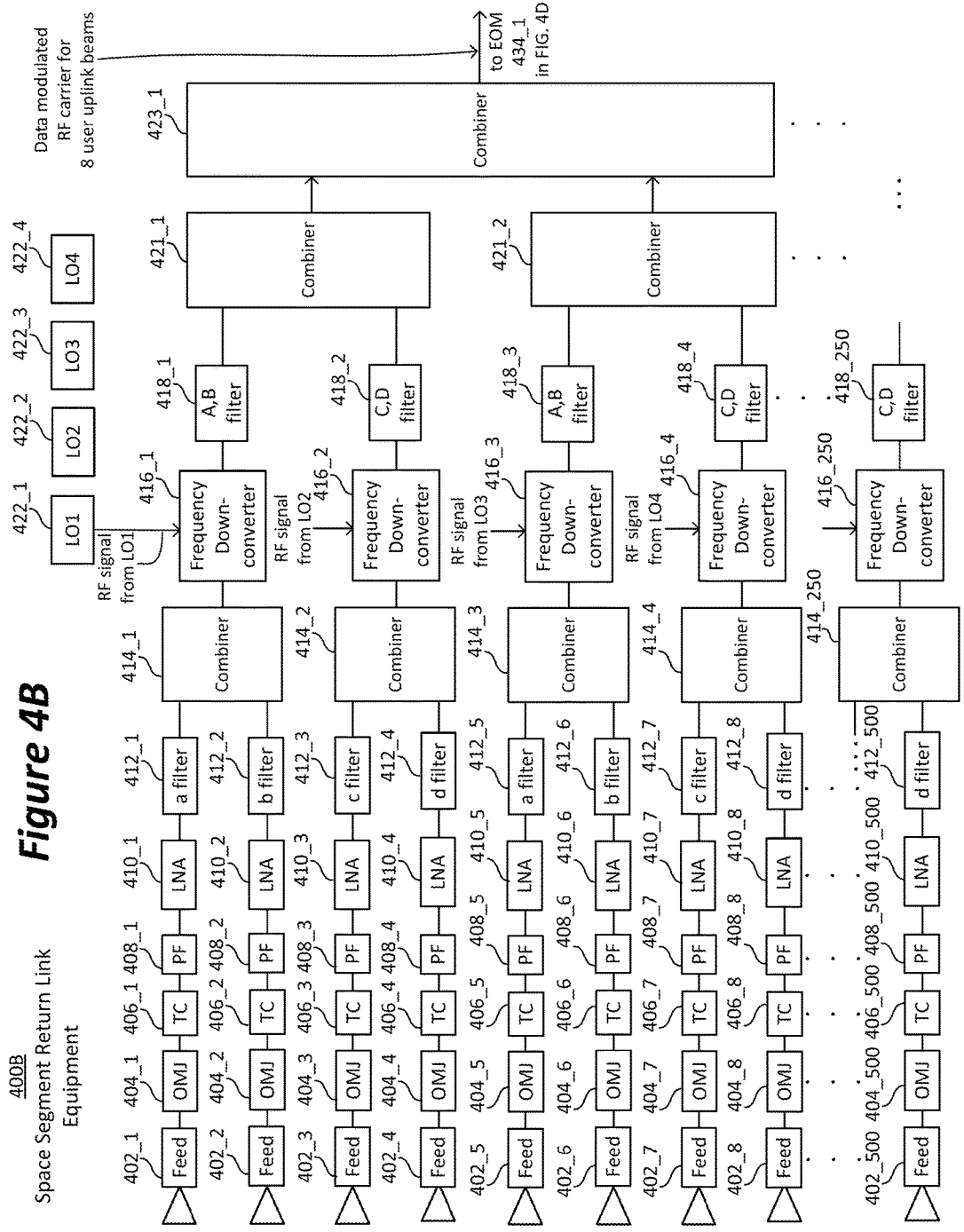

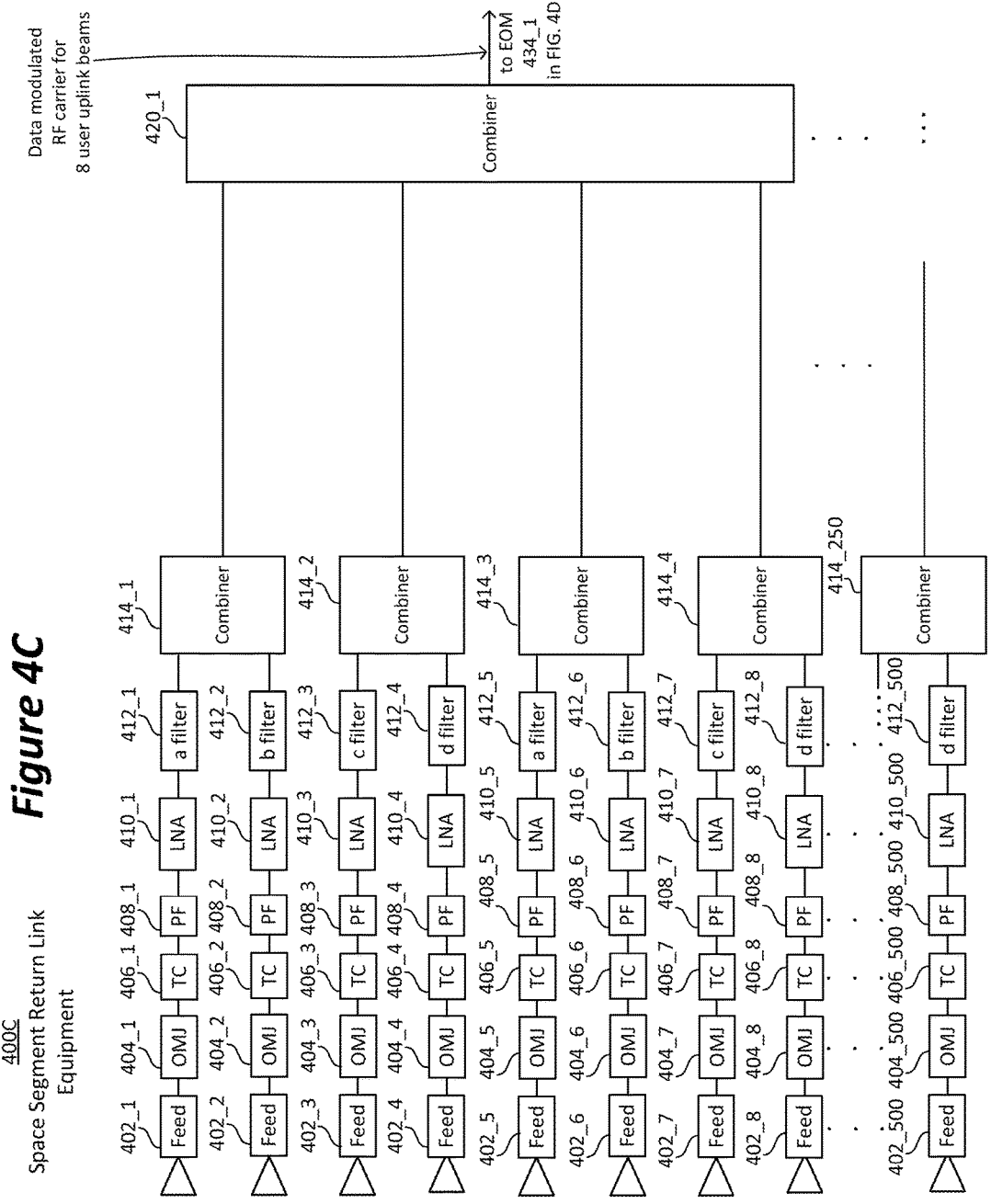

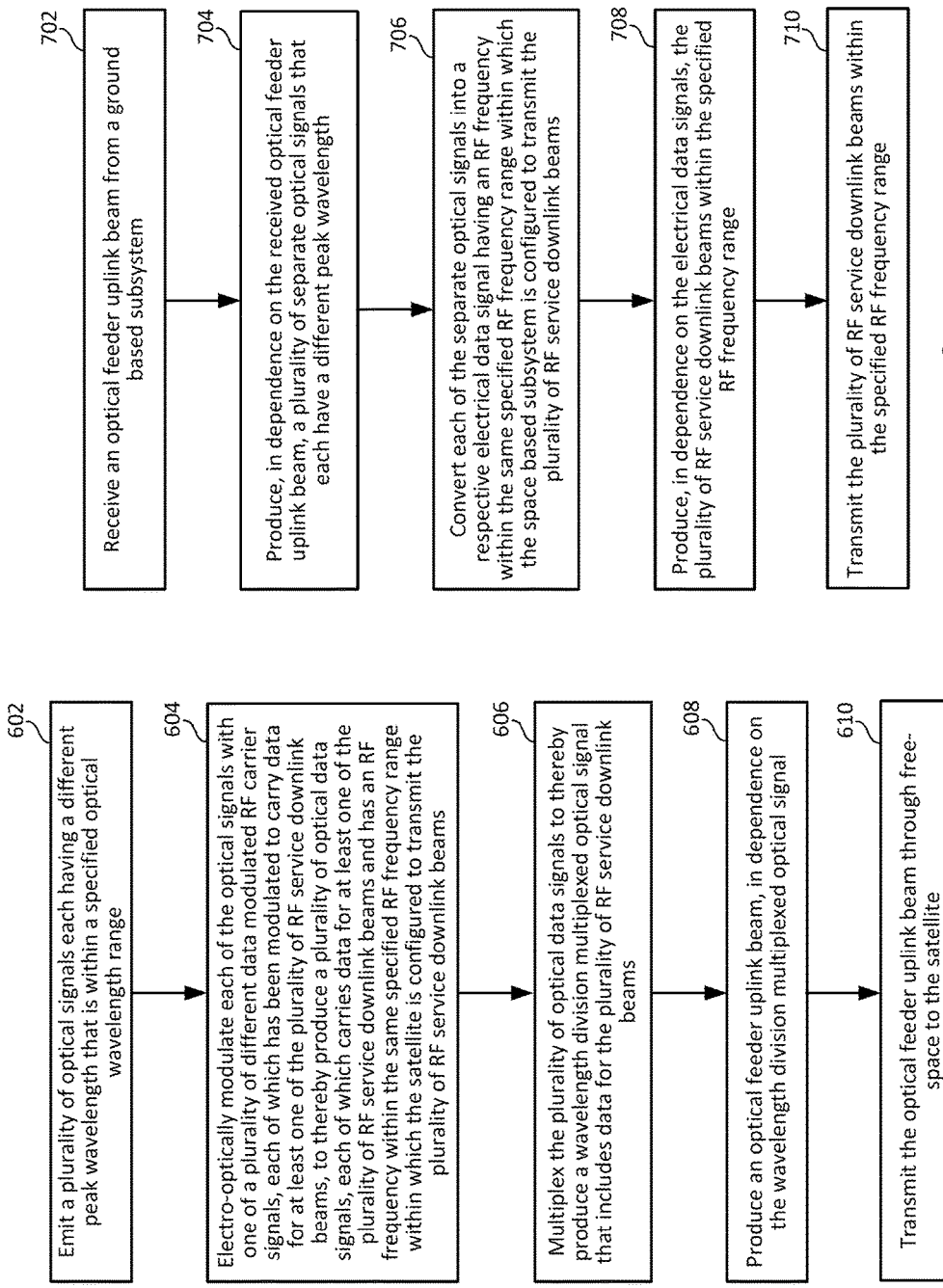

HIGH THROUGHPUT SATELLITE SYSTEM WITH OPTICAL FEEDER UPLINK BEAMS AND RF SERVICE DOWNLINK BEAMS

PRIORITY CLAIM

This application claims priority to U.S. Provisional Patent Application No. 62/350,297, filed Jun. 15, 2016, which is incorporated herein by reference in its entirety.

RELATED APPLICATION

This application is related to commonly invented and assigned U.S. patent application Ser. No. 15/394,602, titled HIGH THROUGHPUT SATELLITE SYSTEM WITH RF SERVICE UPLINK BEAMS AND OPTICAL FEEDER DOWNLINK BEAMS, which is filed on the same day as the present application and is incorporated herein by reference in its entirety.

BACKGROUND

There is increasing need for large amounts of bandwidth to be routed between a ground based gateway and a spaced based satellite. With the recent announcement of planned Ka band and Ku band satellite constellations, it would be beneficial if such frequency band satellite constellations can be used to help satisfy the aforementioned increasing need for large amounts of bandwidth to be routed between a ground based gateway and a spaced based satellite.

BRIEF DESCRIPTION OF THE DRAWINGS

FIG. 2B depicts components that can be used to produce data modulated RF carriers introduced in FIG. 2A, according to an embodiment of the present technology.

FIG. 2C depicts components that can be used to produce data modulated RF carriers introduced in FIG. 2A, according to another embodiment of the present technology.

FIGS. 4A and 4B depicts a portion of space segment return link equipment, according to alternative embodiments of the present technology.

FIG. 4C depicts a portion of space segment return link equipment, according to another embodiment of the present technology.

FIG. 6 is a high level flow diagram that is used to summarize methods for enabling a ground based subsystem to produce and transmit an optical feeder uplink beam to a satellite, according to certain embodiments of the present technology.

FIG. 7 is a high level flow diagram that is used to summarize methods for enabling a space based subsystem of a satellite to produce and transmit a plurality of RF service downlink beams within a specified RF frequency range to service terminals, according to certain embodiments of the present technology.

DETAILED DESCRIPTION

Certain embodiments of the present technology described herein relate to system and sub-system architectures for high throughput satellites (HTS), very high throughput satellites (VHTS) and very very high throughput satellites (VVHTS), which is also known as ultra high throughput satellites (UHTS), all of which can be collectively referred to as HTS. Because of spectrum availability, if feeder links between gateway (GW) sites and satellites are at optical frequencies, then the number of GW sites can be drastically reduced compared to if the feeder links are at RF frequencies, which leads to significant cost savings in the space and ground segments. Even with the availability of 5 GHz spectrum at V band and dual polarization, a satellite with Terabit/sec (Tb/s) capacity would need between 40 and 70 GWs using RF feeder links, depending on the spectral efficiency achieved, as described in a conference paper titled "Optical Feederlinks for VHTS—System Perspectives", by Mata-Calvo et al. (Conference: Proceedings of the Ka and Broadband Communications, Navigation and Earth Observation Conference 2015. Ka Conference 2015, 12-14 Oct. 2015, Bologna, Italy). In contrast, using optical feeder links can reduce the total active GW count to one (plus a few sites would be added for diversity and redundancy; but note that V/Q band or Ka band GWs typically also need diversity and redundancy sites to achieve high availability).

Prior to describing details of specific embodiments of the present technology, it is first useful to describe an exemplary wireless communication system with which embodiments of the present technology would be useful. An example of such a wireless communication system will now be described with reference to FIG. 1.

Figure 1:
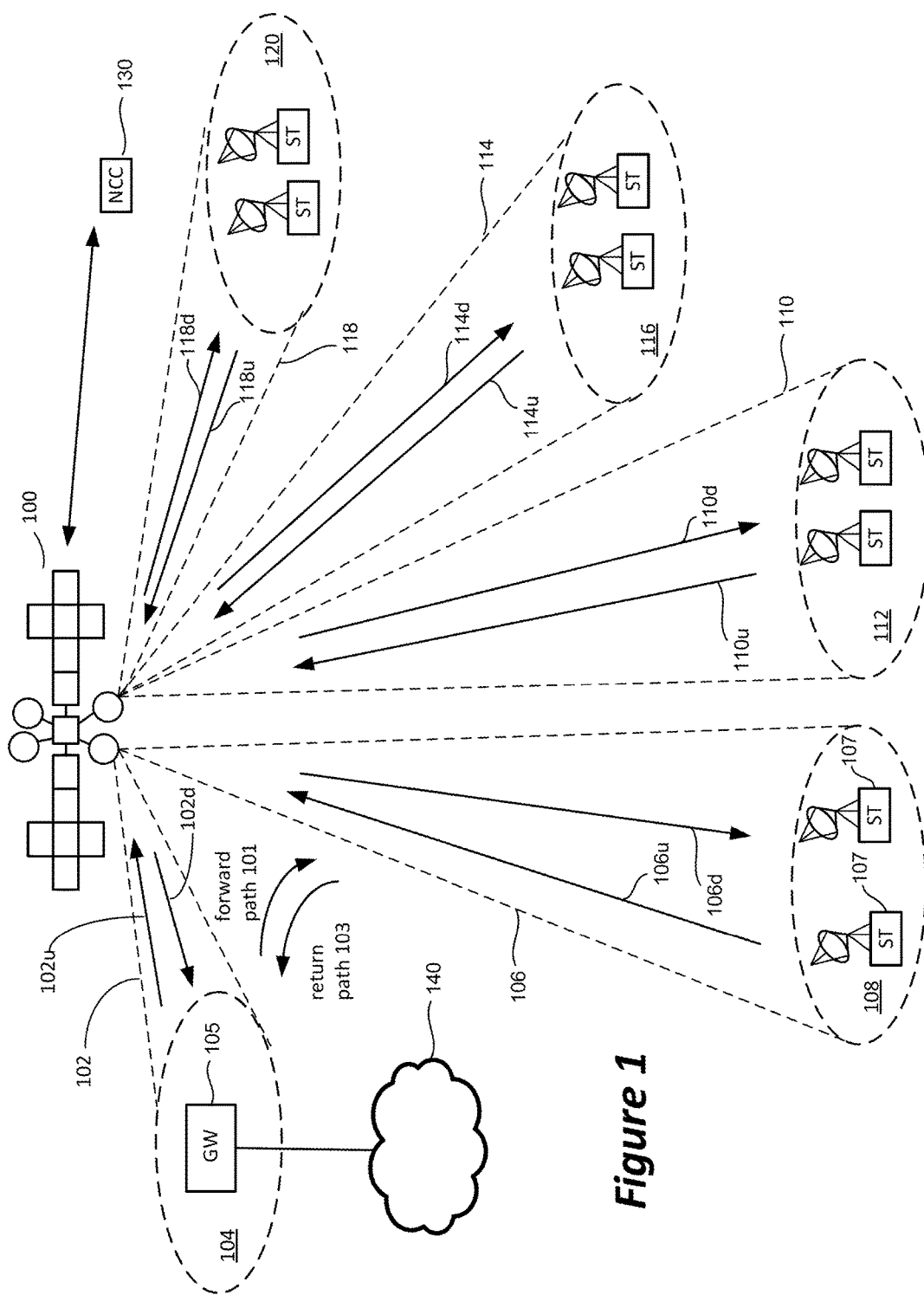
FIG. 1 is a block diagram describing a wireless communication system, which may be a satellite communication system.

FIG. 1 depicts a block diagram of a wireless communications system that includes a communication platform 100, which may be a satellite located, for example, at a geostationary or non-geostationary orbital location. In other embodiments, other platforms may be used such as an unmanned aerial vehicle (UAV) or balloon, or even a ship for submerged subscribers. In yet another embodiment, the subscribers may be air vehicles and the platform may be a ship or a truck where the "uplink" and "downlink" in the following paragraphs are reversed in geometric relations. Platform 100 may be communicatively coupled to at least one gateway (GW) 105 and a plurality of subscriber terminals ST (including subscriber terminals 107). The term subscriber terminals may be used to refer to a single subscriber terminal or multiple subscriber terminals. A subscriber terminal ST is adapted for communication with the wireless communication platform 100, which as noted above, may be a satellite. Subscriber terminals may include fixed and mobile subscriber terminals including, but not limited to, a cellular telephone, a wireless handset, a wireless modem, a data transceiver, a paging or position determination receiver, or mobile radio-telephone, or a headend of an isolated local network. A subscriber terminal may be handheld, portable (including vehicle-mounted installations for cars, trucks, boats, trains, planes, etc.) or fixed as desired. A subscriber terminal may be referred to as a wireless communication device, a mobile station, a mobile wireless unit, a user, a subscriber, or a mobile. Where the communication platform of a wireless communication system is a satellite, the wireless communication system can be referred to more specifically as a satellite communication system. For the remainder of this description, unless stated otherwise, it is assumed that the communication platform 100 is a satellite. Accordingly, platform 100 will often be referred to as satellite 100, and the wireless communication system will often be referred to as a satellite communication system.

In one embodiment, satellite 100 comprises a bus (e.g., spacecraft) and one or more payloads (e.g., the communication payload). The satellite will also include multiple power sources, such as batteries, solar panels, and one or more propulsion systems, for operating the bus and the payload.

The at least one gateway 105 may be coupled to a network 140 such as, for example, the Internet, terrestrial public switched telephone network, mobile telephone network, or a private server network, etc. Gateway 105 and the satellite (or platform) 100 communicate over a feeder beam 102, which has both a feeder uplink 102$u$ and a feeder downlink 102$d$. In one embodiment, feeder beam 102 is a spot beam to illuminate a region 104 on the Earth's surface (or another surface). Gateway 105 is located in region 104 and communicates with satellite 100 via feeder beam 102. Although a single gateway is shown, some implementations will include many gateways, such as five, ten, or more. One embodiment includes only one gateway. Each gateway may utilize its own feeder beam, although more than one gateway can be positioned within a feeder beam. In one embodiment, a gateway is located in the same spot beam as one or more subscriber terminals.

Subscriber terminals ST and satellite 100 communicate over service beams, which are also known as user beams. For example, FIG. 1 shows service beams 106, 110, 114 and 118 for illuminating regions 108, 112, 116 and 120, respectively. In many embodiments, the communication system will include more than four service beams (e.g., sixty, one hundred, etc.). Each of the service beams have an uplink (106$u$, 110$u$, 114$u$, 118$u$) and a downlink (106$d$, 110$d$, 114$d$, 118$d$) for communication between subscriber terminals ST and satellite 100. Although FIG. 1 only shows two subscriber terminals within each region 108, 112, 116 and 120, a typical system may have thousands of subscriber terminals within each region.

In one embodiment, communication within the system of FIG. 1 follows a nominal roundtrip direction whereby data is received by gateway 105 from network 140 (e.g., the Internet) and transmitted over the forward path 101 to a set of subscriber terminals ST. In one example, communication over the forward path 101 comprises transmitting the data from gateway 105 to satellite 100 via uplink 102$u$ of feeder beam 102, through a first signal path on satellite 100, and from satellite 100 to one or more subscriber terminals ST via downlink 106$d$ of service beam 106. An uplink (e.g., 102$u$) of a feeder beam (e.g., 102) can also be referred to more succinctly as a feeder uplink beam, and the downlink (e.g., 106$d$) of a service beam (e.g., a 106) can also be referred to more succinctly as a service downlink beam. Although the above example mentions service beam 106, the example could have used other service beams.

Data can also be sent from the subscriber terminals STs over the return path 103 to gateway 105. In one example, communication over the return path comprises transmitting the data from a subscriber terminal (e.g., subscriber terminal 107 in service beam 106) to satellite 100 via uplink 106$u$ of service beam 106, through a second signal path on satellite 100, and from satellite 100 to gateway 105 via downlink 102$d$ of feeder beam 102. An uplink (e.g., 106$u$) of a service beam (e.g., 106) can also be referred to more succinctly as a service uplink beam, and the downlink 102$d$ of feeder beam 102 can also be referred to more succinctly as a feeder downlink beam. Although the above example uses service beam 106, the example could have used any service beam.

FIG. 1 also shows a Network Control Center (NCC) 130, which can include an antenna and modem for communicating with satellite 100, as well as one or more processors and data storage units. Network Control Center 130 provides commands to control and operate satellite 100. Network Control Center 130 may also provide commands to any of the gateways and/or sub scriber terminals.

In one embodiment, communication platform 100 implements the technology described below. In other embodiments, the technology described below is implemented on a different platform (or different type of satellite) in a different communication system. For examples, the communication platform can alternatively be a UAV or balloon, but is not limited thereto.

The architecture of FIG. 1 is provided by way of example and not limitation. Embodiments of the disclosed technology may be practiced using numerous alternative implementations.

Conventionally, a gateway (e.g., gateway 105) communicates with a satellite (e.g., satellite 100) using an antenna on the ground that transmits and receives RF (radiofrequency) signals to and from an antenna on the satellite. Certain embodiments of the present technology utilize optical components instead of antennas to transmit and receive optical signals between a gateway and a satellite, as will be described in additional details below.

Certain embodiments of the present technology involve the use of analog-over free-space optical signals, which leads to an elegant architecture for a satellite repeater, whereby all frequency down-conversion in the forward link is eliminated. An advantage of this approach, especially for HTS satellites, is that it eliminates the need for very high speed Analog-to-Digital Converters (ADCs) and Digital to Analog Converters (DACs) on the satellites. Further, this approach allows the aggregation of multiple user links but does not require extra hardware associated with an onboard demodulator and remodulator, and thus reduces the mass, power and cost of the satellite, perhaps making the difference between being able to launch or not being able to launch the satellite. In addition, in accordance with specific embodiments where the uplink and downlink communication signals are modulated at transmit (forward) and receive (return) RF frequencies, no frequency conversion in the forward link is required on the satellite, thereby further simplifying the payload design. By contrast, previously envisioned free-space optical spacecraft architectures proposed demodulation of the optical signal, followed by routing to user link pathways and remodulation of the signal on user link RF frequencies.

Block diagrams for the communications subsystems for the ground and space segments, according to certain embodiments of the present technology, are described below with reference to FIGS. 2A, 3, 4A, 4B, 4C, 4D and 5. Certain embodiments use analog modulation and demodulation on the satellite, thus enabling optical feeder links without onboard processing.

Figure 2A:
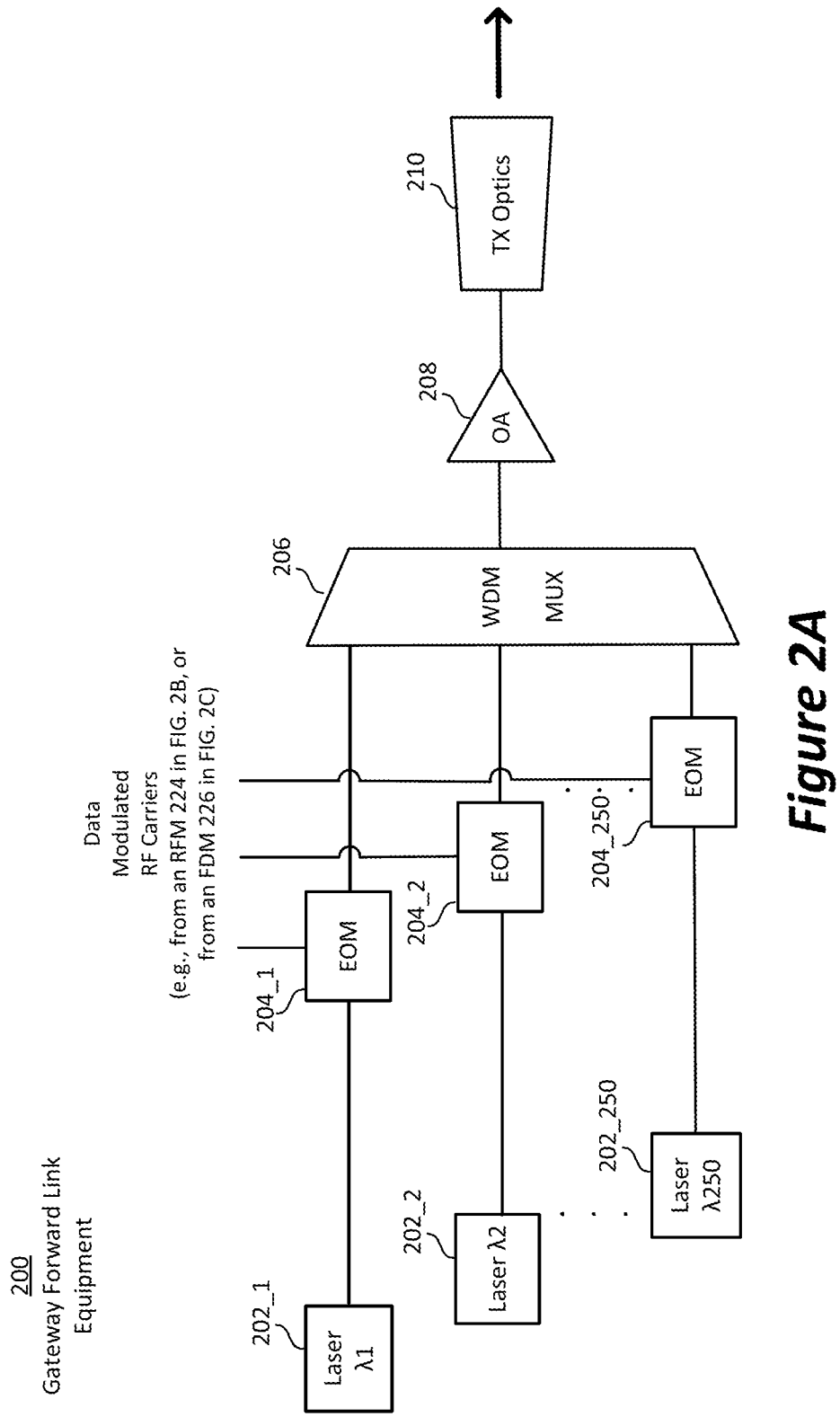
FIG. 2A depicts gateway forward link equipment, according to an embodiment of the present technology.
Figure 3:
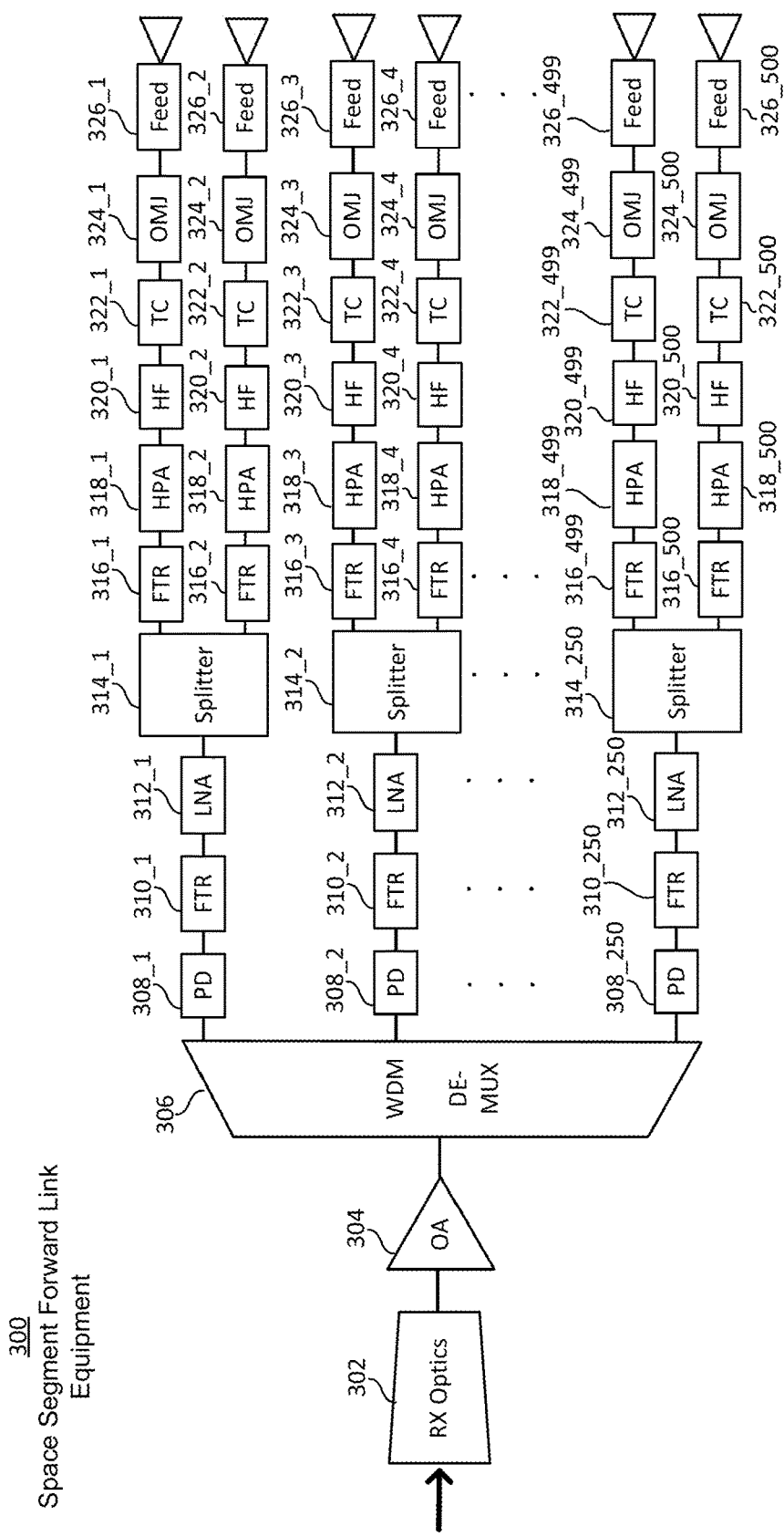
FIG. 3 depicts space segment forward link equipment, according to an embodiment of the present technology.

FIGS. 2A-2C will first be used to describe gateway forward link equipment according to certain embodiments of the present technology. FIG. 3 will then be used to describe space segment forward link equipment according to an embodiment of the present technology. In specific embodiments, 250 laser wavelengths are combined at a single gateway (which can be referred to as an optical gateway) and sent to the satellite, which has 500 user beams (also known as service beams) operating at Ka band frequencies. In accordance with an embodiment, each wavelength carries 2.5 GHz so that a total of 625 GHz is sent from the gateway on the ground to the satellite. At a modest spectral efficiency of 2 bps/Hz, this leads to a 1.25 Tb/s satellite design. In accordance with another embodiment, each wavelength carries 2.9 GHz so that a total of 725 GHz is sent from the gateway on the ground to the satellite. At a modest spectral efficiency of 2 bps/Hz, this leads to a 1.45 Tb/s satellite design. FIGS. 4A-4C and 5 will thereafter be used to depict return link equipment for a satellite and a gateway.

Gateway Forward Link Equipment

FIG. 2A will now be used to describe gateway forward link equipment 200, according to an embodiment of the present technology. Such gateway forward link equipment 200 can also be referred to as an optical gateway forward link subsystem 200, or more generally, as an optical communication subsystem. Referring to FIG. 2A, the optical gateway forward link subsystem 200 is shown as including two hundred and fifty lasers 202_1 to 202_250, two hundred and fifty electro-optical modulator (EOMs) 204_1 to 204_250, a wavelength-division multiplexing (WDM) multiplexer (MUX) 206, an optical amplifier (OA) 208 and transmitter optics 210. Each of these elements are described below.

The two hundred and fifty separate lasers 202_1 to 202_250 each emit light of a different wavelength within a specified wavelength range that is for use in producing the optical feeder uplink beam (e.g., 102u). The lasers can be referred to individually as a laser 202, or collectively as the lasers 202. Where the specified wavelength range is, for example, from 1510 nanometers (nm) to 1560 nm, then the laser 202_1 may emit light having a peak wavelength of 1510 nm, the laser 202_2 may emit light having a peak wavelength of 1510.2 nm, the laser 202_3 (not shown) may emit light having a peak wavelength of 1510.4 nm, . . . the laser 202_249 (not shown) may emit light having a peak wavelength of 1559.8 nm, and the laser 202_250 may emit light having a peak wavelength of 1660 nm. In other words, the peak wavelengths emitted by the lasers 202 can occur at 0.2 nm intervals from 1510 nm to 1560 nm. The wavelength range from 1510 nm to 1560 nm, which is within the infrared (IR) spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder uplink beam (e.g., 102u) is non-contiguous. For example, the wavelength range that is for use in producing the optical feeder uplink beam can be from 1510 nm to 1534.8 nm and from 1540.2 nm to 1564.8 nm. Further, it is also possible that gateway forward link equipment can alternatively include more or less than two hundred and fifty lasers (that each emit light of a different peak wavelength within a specified contiguous or non-contiguous wavelength range). Additionally, it is noted that the gateway forward link equipment may include two or more of each of the lasers (that each emit light of a different peak wavelength within a specified contiguous or non-contiguous wavelength range) to provide for redundancy or backup. Each of the lasers 202 can be, for example, a diode-pumped infrared neodymium laser, although the use of other types of lasers are also within the scope of the embodiments described herein.

To reduce and preferably avoid interference, the wavelength range that is for use in producing the optical feeder uplink beam (e.g., 102u) should be different than the wavelength range that is for use in producing the optical feeder downlink beam (e.g., 102d). For example, if the wavelength range that is for use in producing the optical feeder uplink beam 102u is from 1510 nm to 1560 nm, then the wavelength range that is for use in producing the optical feeder downlink beam 102d can be from 1560.2 nm to 1575 nm. For another example, if the wavelength range that is for use in producing the optical feeder uplink beam 102u is from 1510 nm to 1534.8 nm and from 1540.2 nm to 1564.8 nm, then the wavelength range that is for use in producing the optical feeder downlink beam 102d can be from 1535 nm to 1540 nm and from 1565 nm to 1575 nm. These are just a few examples, which are not intended to be all encompassing. Details of how an optical feeder downlink beam (e.g., 102d) can be produced in accordance with an embodiment of the present technology are provided below in the discussion of FIGS. 4A, 4B and 4C.

Still referring to FIG. 2A, the light emitted by each of the two hundred and fifty lasers 202, which can be referred to as an optical carrier signal, is provided (e.g., via a respective optical fiber) to a respective one of the two hundred and fifty separate EOMs 204_1 to 204_250. The EOMs can be referred to individually as an EOM 204, or collectively as the EOMs 204. Each of the EOMs is an optical device in which a signal-controlled element exhibiting an electro-optic effect is used to modulate a respective beam of light. The modulation performed by the EOMs 204 may be imposed on the phase, frequency, amplitude, or polarization of a beam of light, or any combination thereof. In accordance with a specific embodiment, each of the EOMs 204 is a phase modulating EOM that is used as an amplitude modulator by using a Mach-Zehnder interferometer. In other words, each of the EOMs 204 can be implemented as a Mach-Zehnder modulator (MZM), which can be a Lithium Niobate Mach-Zehnder modulator, but is not limited thereto. In accordance with specific embodiments, each of the EOMs 204 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 204 can be referred to as an optical data signal. The modulation scheme that is implemented by the EOMs 204 can result in double- or vestigial-sidebands, including both an upper sideband (USB) and a lower sideband (LSB). Alternatively single-sideband modulation (SSB) can be utilized to increase bandwidth and transmission power efficiency.

The two hundred and fifty separate optical data signals that are output by the two hundred and fifty EOMs 204 are provided to the WDM MUX 206, which can also be referred to as a dense wavelength division multiplexing (DWDM) MUX. The WMD MUX 206 multiplexes (i.e., combines) the two hundred and fifty optical data signals, received from the two hundred and fifty EOMs 204, onto a single optical fiber, with each of the two hundred and fifty separate optical data signals being carried at the same time on its own separate optical wavelength within the range from 1510 nm to 1560 nm. For example, as explained above, the two hundred and fifty separate optical data signals can have peak wavelengths of 1510 nm, 1510.2 nm, 1510.4 nm . . . 1559.8 nm and 1560 nm.

The signal that is output by the WMD MUX 206, which can be referred to as a wavelength division multiplexed optical signal, is provided to the optical amplifier (OA) 208. The OA 208 amplifies the wavelength division multiplexed optical signal so that the wavelength division multiplexed optical signal has sufficient power to enable transmission thereof from the ground to the satellite 100 in space. An exemplary type of OA 208 that can be used is an erbium-doped fiber amplifier (EDFA). However embodiments of the present technology are not limited to use with an EDFA. The output of the OA 208 can be referred to as an optically amplified wavelength division multiplexed optical signal.

The optically amplified wavelength division multiplexed optical signal, which is output by the OA 208, is provided (e.g., via an optical fiber) to the transmitter optics 210. The transmitter optics 210, which can also be referred to as a telescope, can includes optical elements such as lenses, mirrors, reflectors, filters and/or the like. The transmitter optics 210 outputs a collimated optical feeder uplink beam that is aimed at a satellite. A gimbal, and/or the like, can be used to control the steering of the transmitter optics 210. In accordance with an embodiment, the collimated optical feeder uplink beam has an aperture of about 100 cm, and a half beam divergence of about 0.0000004 radians, wherein the term "about" as used herein means+/−10 percent of a specified value. The use of other apertures and half beam divergence values are also within the scope of the embodiments described herein. The collimated optical feeder uplink beam, which is output by the transmitter optics 210, is transmitted in free-space to receiver optics on a satellite. The term "free-space" means air, outer space, vacuum, or something similar (which is in contrast to using solids such as optical fiber cable, an optical waveguide or an optical transmission line). Reception and processing of the optical feeder uplink beam received at the satellite will be described in additional detail below. However, before describing the reception and processing of the optical feeder uplink beam received at the satellite, additional details of the gateway forward link equipment, according to certain embodiments of the present technology, will first be provided.

Referring again to the EOMs 204, in accordance with certain embodiments of the present technology, each of the EOMs 204 modulates the optical signal it receives (e.g., via an optical fiber from a respective laser 202) with a separate RF signal that has already been modulated to include user data. In order to eliminate the need for RF frequency down-converters in the forward link equipment onboard the satellite, the carrier frequencies of the RF signals that are used to modulate each of the two hundred and fifty lasers 202 on the ground (e.g., in gateway 105) correspond to the desired user downlink frequency band within the Ka band (or some other allotted band). As a result, the satellite repeater is greatly simplified.

For example, a portion of the Ka band that may be desirable to use for transmitting service downlink beams (also referred to as downlink user beams) from satellite 100 to service terminals ST can be from 17.7-20.2 GHz, and thus, includes a 2.5 GHz bandwidth. In such a case, each of the EOMs 204 could modulate the optical signal it receives (e.g., via an optical fiber from a respective laser 202) with a separate RF signal having a frequency within the range from 17.7-20.2 GHz. Further, since each of the two hundred and fifty optical data signals (produced by the two hundred and fifty EOMs) has a bandwidth of 2.5 GHz, the bandwidth of the optical feeder uplink beam that is sent from the ground to the satellite is 625 GHz (i.e., 2.5 GHz*250=625 GHz).

For another example, a portion of the Ka band that may be desirable to use for transmitting service downlink beams (also referred to as downlink user beams) from satellite 100 to service terminals ST can be from 17.3-20.2 GHz, and thus, includes a 2.9 GHz bandwidth. In such a case, each of the EOMs 204 could modulate the optical signal it receives (e.g., via an optical fiber from a respective laser 202) with a separate RF signal having a frequency within the range from 17.3-20.2 GHz. Further, since each of the two hundred and fifty optical data signals (produced by the two hundred and fifty EOMs) has a bandwidth of 2.9 GHz, the bandwidth of the optical feeder uplink beam that is sent from the ground to the satellite is 725 GHz (i.e., 2.9 GHz*250=725 GHz).

Where there is a desire or requirement that satellite 100 transmits five hundred separate service downlink beams, then the portion of the optical feeder uplink beam that is produced by each of the two hundred and fifty lasers 202 needs to be modulated to carry the data for two of the five hundred service downlink beams. In other words, each of the optical signals produced by each of the two hundred and fifty lasers 202 needs to be modulated to carry the data for two of the five hundred service downlink beams. This can be achieved by using half of the available portion of the Ka band for carrying the data for one service downlink beam, and the other half of the available portion of the Ka band for carrying the data for another service downlink beam. For example, where the portion of the Ka band that is available for transmitting service downlink beams (also referred to as downlink user beams) is from 17.7-20.2 GHz, then 17.7-18.95 GHz can be used for carrying the data for one service downlink beam, and 18.95-20.2 GHz can be used for carrying the data for another service downlink beam. For another example, where the portion of the Ka band that is available for transmitting service downlink beams (also referred to as downlink user beams) is from 17.3-20.2 GHz, then 17.3-18.75 GHz can be used for carrying the data for one service downlink beam, and 18.75-20.2 GHz can be used for carrying the data for another service downlink beam.

FIG. 2B depicts components that can be used to produce one of the data modulated RF carriers introduced in FIG. 2A, according to an embodiment of the present technology. The components shown in FIG. 2B would be useful where each of the optical data signals produced by each of the EOMs 204 carries the data for one service downlink beam (e.g., for one of the two hundred and fifty service downlink beams). Referring to FIG. 2B, shown therein is a local oscillator (LO) 222 that produces an RF carrier signal within the portion of the Ka band that is available for transmitting service downlink beams (also referred to as downlink user beams). For example, the LO 222 may produce an RF carrier within the RF frequency range from 17.7-20.2 GHz (e.g., at 18.95 GHz, but not limited thereto). For another example, the LO 222 may produce an RF carrier within the RF frequency range from 17.3-20.2 GHz (e.g., at 18.75 GHz, but not limited thereto). The RF carrier signal that is output by the LO 222 is provided to an RF modulator (RFM) 224, which also receives a data signal. The RFM 224 modulates that data signal onto the RF carrier signal to produce a data modulated RF carrier signal, which is provided to one of the EOMs 204 shown in FIG. 2A. Where two hundred and fifty data modulated RF carrier signals are produced (each of which is provided to a different one of the EOMs 204), the components shown in FIG. 2B can be duplicated two hundred and fifty times. Alternatively, the two hundred and fifty RFMs 224 can receive the same carrier signal from a common LO 222, with each of the RFMs 224 receiving a separate data signal.

FIG. 2C depicts components that can be used to produce one of the data modulated RF carriers introduced in FIG. 2A, according to an alternative embodiment of the present technology. The components shown in FIG. 2C would be useful where each of the optical data signals produced by each of the EOMs 204 carries the data for two of the service downlink beams (e.g., for two of the five hundred service downlink beams). Referring to FIG. 2C, shown therein is a first LO 222_1 and a second LO 222_2, a first RFM 224_1 and a second RFM 224_2, and a frequency division multiplexer (FDM) 226. The LO 222_1 and the LO 222_2 each produces a different RF carrier signal within the portion of the Ka band that is available for transmitting service downlink beams (also referred to as downlink user beams). For example, the LO 222_1 may produce an RF carrier within the RF frequency range from 17.7-18.95 GHz (e.g., at 18.325 GHz, but not limited thereto), and the LO 222_2 may produce an RF carrier within the RF frequency range from 18.95-20.2 GHz (e.g., at 19.575, but not limited thereto). For another example, the LO 222_1 may produce an RF carrier within the RF frequency range from 17.3-18.75 GHz (e.g., at 18.025 GHz, but not limited thereto), and the LO 222_2 may produce an RF carrier within the RF frequency range from 18.75-20.2 GHz (e.g., at 19.475, but not limited thereto). The RFM 224_1 modulates a first data signal onto the RF carrier signal produced by the LO 222_1 to thereby produce a first data modulated RF carrier signal. The RFM 224_2 modulates a second data signal onto the RF carrier signal produced by the LO 222_2 to thereby produce a second data modulated RF carrier signal. The first and second data modulated RF carrier signals, which are produced by the RFMs 224_1 and 224_2, are provided to the FDM 226. The FDM 226 frequency multiplexes the first and second data modulated RF carrier signals, received from the two RFMs 224_1 and 224_2, onto a single carrier medium (e.g., cable, wire or trace), with each of the two data modulated RF carrier signals being carried at the same time at its own separate frequency sub-band. The output of the FDM 226 is provided to one of the EOMs 204 shown in FIG. 2A. Where two hundred and fifty data modulated RF carrier signals are produced (each of which is provided to a different one of the EOMs 204), the components shown in FIG. 2C can be duplicated two hundred and fifty times. Alternatively, two hundred and fifty of the RFMs 224 can receive the same carrier signal from a common LO 222_1, and another two hundred and fifty RFMs 224 can receive the same carrier signal from a common LO 222_2, with each of the RFMs 224 receiving a separate data signal. Other variations are also possible, and within the scope of an embodiment of the present technology.

The RFMs 224 can perform various different types of RF modulation, depending upon implementation and other factors such channel conditions. For example, the RFMs 224 can perform Amplitude-shift keying (ASK), Phase-shift keying (PSK), or Amplitude and phase-shift keying (APSK) types of modulation (e.g., 16-, 128- or 256-APSK), just to name a few. In accordance with certain embodiments, the modulation scheme performed by the RFMs 224 and EOMs 204 cause the signals that are transmitted from the ground to a satellite to be in conformance with the Digital Video Broadcasting-Satellite-Second Generation (DVB-S2) standard, or the related DVB-S2X standard (which is an extension of the DVB-S2 standard).

Referring again to FIG. 2A, in order to wavelength division multiplex two hundred and fifty wavelengths produced by the two hundred and fifty lasers 202_1 to 202_250, a combination of C band optical frequencies (from 1530 nm to 1565 nm) and L band optical frequencies (from 1565 nm to 1625 nm) may be used, in order to keep the separation of the wavelengths to be at least 20-25 GHz in order to reduce and preferably minimize inter-wavelength interference that may occur in an optical fiber due to non-linearities. If fewer wavelengths are used (e.g., at C band alone), and higher bandwidth is available at Ka band per user beam (e.g., if 2.9 GHz is available as it is in certain ITU Regions), the overall throughput still remains of the order of several hundred GHz, which lets the capacity reach the Tb/s range. If instead each wavelength carries more than the Ka band user bandwidth, fewer wavelengths can be used, but some amount of frequency conversion would be needed in the space segment forward link equipment.

Space Segment Forward Link Equipment

FIG. 3 will now be used to describe space segment forward link equipment 300 according to an embodiment of the present technology. Such space segment forward link equipment 300, which can also be referred to as a forward link satellite subsystem 300, or more generally, as an optical communication subsystem, is configured to receive the optical signal that is transmitted from the ground based optical gateway subsystem 200 to the satellite that is carrying the space segment forward link equipment 300. The space segment forward link equipment 300 is also configured to convert the optical signal that it receives (from the ground based optical gateway subsystem 200) into electrical signals, and to produce service beams therefrom, wherein the service beams are for transmission from the satellite to service terminals STs.

Referring to FIG. 3, the forward link satellite subsystem 300 is shown as including receiver optics 302, an optical amplifier (OA) 304, a wavelength-division multiplexing (WDM) demultiplexer (DEMUX) 306, two hundred and fifty photodetectors (PDs) 308_1 to 308_250, two hundred and fifty filters 310_1 to 310_250, two hundred and fifty low noise amplifiers (LNAs) 312_1 to 312_250, and two hundred and fifty splitters 314_1 to 314_250. The forward link satellite subsystem 300 is also shown as including five hundred filters 316_1 to 316_500, high power amplifiers (HPAs) 318_1 to 318_500, harmonic filters (HFs) 320_1 to 320_500, test couplers (TCs) 322_1 to 322_500, orthomode junctions (OMJs) 324_1 to 324_500, and feed horns 326_1 to 326_500. The PDs 308_1 to 308_250 can be referred to individually as a PD 308, or collectively as the PDs 308. The filters 310_1 to 310_250 can be referred to individually as a filter 310, or collectively as the filters 310. The LNAs 312_1 to 312_250 can be referred to individually as an LNA 312, or collectively as the LNAs 312. The filters 316_1 to 316_500 can be referred to individually as a filter 316, or collectively as the filters 316. The HPAs 318_1 to 318_500 can be referred to individually as an HPA 318, or collectively as the HPAs 318. The HFs 320_1 to 320_500 can be referred to individually as an HF 320, or collectively as the HFs 320. The TCs 322_1 to 322_500 can be referred to individually as a TC 322, or collectively as the TCs 322. The OMJs 324_1 to 324_500 can be referred to individually as an OMJ 324, or collectively as the OMJs 324. The feed horns 326_1 to 326_500 can be referred to individually as a feed horn 326, or collectively as the feed horns 326.

The receiver optics 302, which can also be referred to as a telescope, can includes optical elements such as mirrors, reflectors, filters and/or the like. The receiver optics 302 receives the optical feeder uplink beam that is transmitted through free-space to the satellite by the ground based optical gateway forward link subsystem 200, and provides the received optical feeder uplink beam (e.g., via an optical fiber) to the OA 304. A gimbal, and/or the like, can be used to control the steering of the receiver optics 302. When the optical feeder uplink beam reaches the satellite, the power of the optical feeder uplink beam is significantly attenuated compared to when it was transmitted by the ground based optical gateway subsystem 200. Accordingly, the OA 304 is used to amplify the received optical feeder uplink beam before it is provided to the WDM DEMUX 306. The OA 304 can be, e.g., an erbium-doped fiber amplifier (EDFA), but is not limited thereto. The output of the OA 304 can be referred to as an optically amplified received optical feeder uplink beam. The WDM DEMUX 306 demultiplexes (i.e., separates) the received optical feeder uplink beam (after it has been optically amplified) into two hundred and fifty separate optical signals, each of which is provided to a separate photodetector (PD) 308. Each PD 308 converts the optical signal it receives from the WDM DEMUX 306 to a respective RF electrical signal. The RF electrical signal produced by each PD 308 is provided to a respective filter (FTR) 310 (e.g., a bandpass filter) to remove unwanted frequency components and/or enhance desired frequency components. For an example, each filter 310 can pass frequencies within the range of 17.7-20.2 GHz, or within the range of 17.3-20.2 GHz, but are not limited thereto. The filtered RF electrical signal, which is output by each filter 310, is provided to a respective low noise amplifier (LNA) 312. Each LNA 312 amplifies the relatively low-power RF signal it receives from a respective filter 310 without significantly degrading the signals signal-to-noise ratio. The amplified RF signal that is output by each LNA 312 is provided to a respective splitter 314.

The splitter 314 splits the amplified RF signal it receives into two copies, each of which has half the power of the amplified RF signal that is provided to the input of the splitter 314. Each splitter 314 can be implemented by a hybrid, but is not limited thereto. In accordance with certain embodiments of the present technology, one of the RF signals that is output by a splitter 314 is used to produce one service beam, and the other RF signal that is output by the same splitter 314 is used to produce another service beam. Each of the copies of the RF signal that is output by the splitter 314 is provided to a respective filter 316. For example, the splitter 314_1 provides one copy of the RF signal it receives to the filter 316_1, and provides another copy of the RF signal it receives to the filter 316_2. In accordance with certain embodiments, the pair of filters 316 that receive RF signals from the same splitter 314 have pass bands that differ from one another. For example, the filter 316_1 may have a passband of 17.7-18.95 GHz and the filter 316_2 may have a passband of 18.95-20.2 GHz. For another example, the filter 316_1 may have a passband of 17.3-18.75 GHz and the filter 316_2 may have a passband of 18.75-20.2 GHz. This enables each splitter 314 and pair of filters 316, which are fed by the splitter 314, to separate a signal received by the splitter into two separate RF signals corresponding to two separate user beams. The use of other passbands are possible and within the scope of an embodiment of the present technology.

Each HPA 318 amplifies the RF signal it receives so that the RF signal has sufficient power to enable transmission thereof from the satellite 100 in space to an ST, which may be on the ground. Each HPA 318 can be, e.g., a liner traveling wave tube high power amplifier, but is not limited thereto. The signal that is output by each of the HPAs 318 can be referred to as an amplified RF signal. Each HF 320 is used to reduce and preferably remove any distortion in the amplified RF signal that was caused by a respective HPA 318. Each HF 320 can be, e.g., a waveguide cavity filter, but is not limited thereto. Each test coupler TC 322 can be used for power monitoring, payload testing and/or performing calibrations based on signals passing therethrough. Each OMJ 324 adds either right hand circular polarization (RHCP) or left hand circular polarization (LHCP) to the RF signal that is passed through the OMJ. This allows for color reuse frequency band allocation, wherein each color represents a unique combination of a frequency band and an antenna polarization. This way a pair of feeder beams that illuminate adjacent regions can utilize a same RF frequency band, so long as they have orthogonal polarizations. Alternatively, each OMJ 324 adds either horizontal linear polarization or vertical linear polarization to the RF signal that is passed through the OMJ. Each feed horn 326 converts the RF signal it receives, from a respective OMJ 324, to radio waves and feeds them to the rest of the antenna system (not shown) to focus the signal into a service downlink beam. A feed horn 326 and the rest of an antenna can be collectively referred to as the antenna. In other words, an antenna, as the term is used herein, can include a feed horn. All or some of the feed horns 326 can share a common reflector. Such reflector(s) is/are not shown in the Figures, to simply the Figures.

Space Segment Return Link Equipment

Figure 4A:
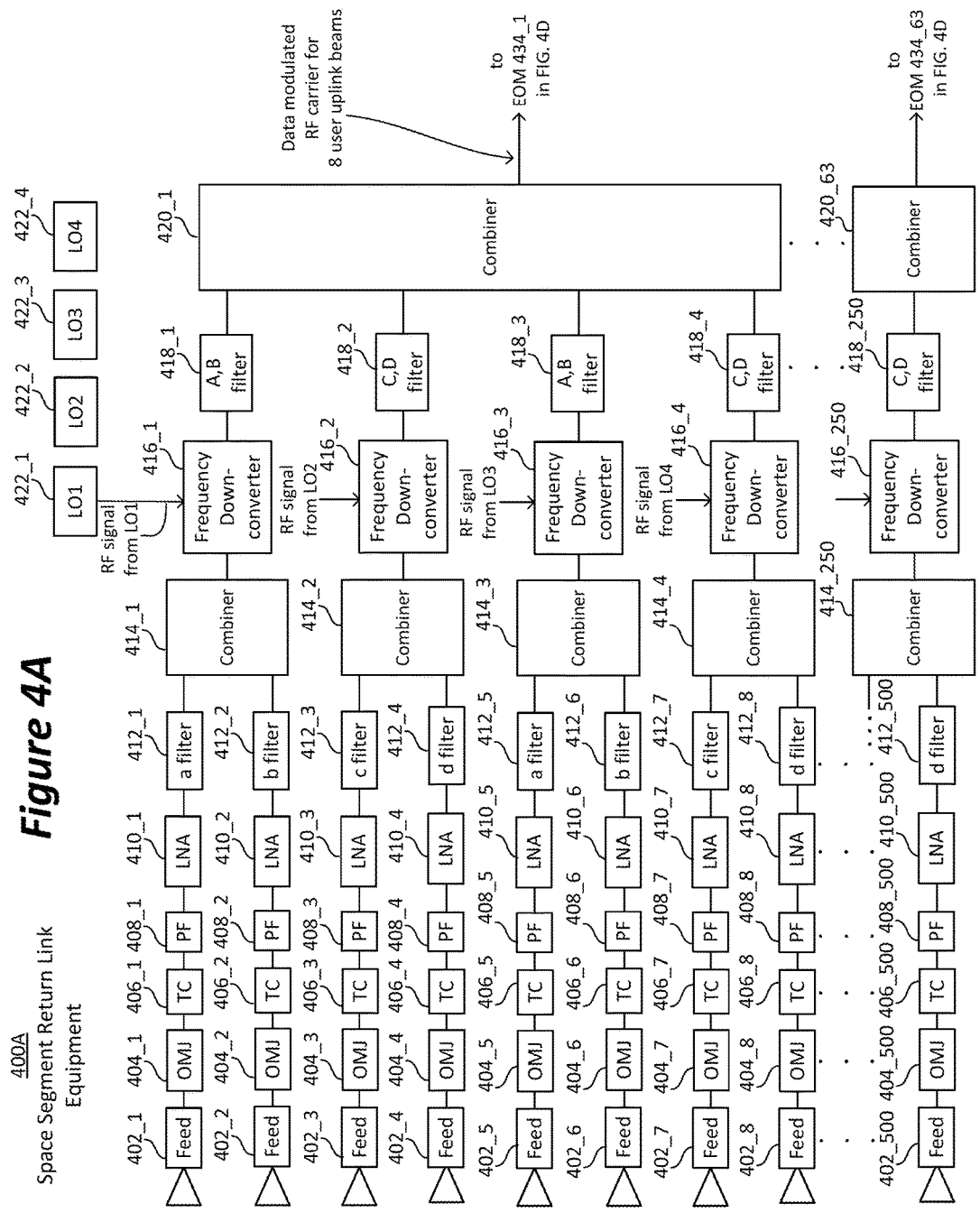
Figure 4D:
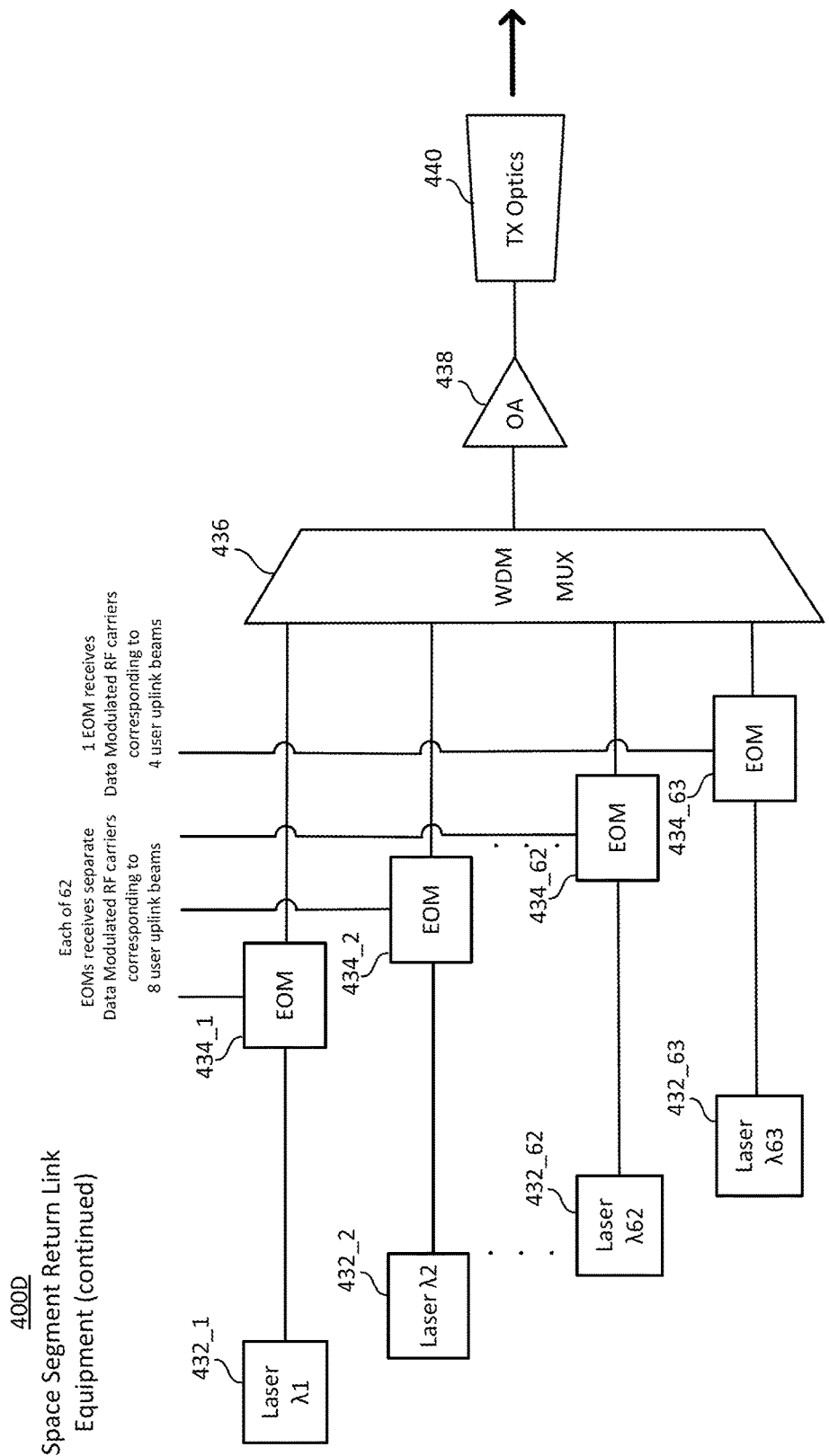
FIG. 4D depicts a further portion of space segment return link equipment, according to an embodiment of the present technology.

FIG. 4A will now be used to describe a portion of space segment return link equipment 400A, according to an embodiment of the present technology. Such space segment return link equipment 400A, which can also be referred to as a satellite return link subsystem 400A, or more generally, as an optical communication subsystem, is configured to receive the RF signals that are transmitted by service terminals STs to the satellite (e.g., 100) that is carrying the space segment return link equipment 400A. The space segment return link equipment 400A, together with the space segment return link equipment 400D in FIG. 4D, is also configured to convert the RF signals that it receives (from the service terminals STs) into optical signals, and to produce optical return feeder beams therefrom, wherein the optical return feeder beams are for transmission from the satellite (e.g., 100) to a ground based gateway (e.g., 105).

Referring to FIG. 4A, the portion of the space segment return link equipment 400A shown therein includes feed horns 402_1 to 402_500 (which can be referred to individually as a feed horn 402, or collectively as the feed horns 402), orthomode junctions (OMJs) 404_1 to 404_500 (which can be referred to individually as an OMJ 404, or collectively as the OMJs 404), test couplers (TCs) 406_1 to 406_500 (which can be referred to individually as a TC 406, or collectively as the TCs 406), pre-select filters (PFs) 408_1 to 408_500 (which can be referred to individually as a PF 408, or collectively as the PFs 408), low noise amplifiers (LNAs) 410_1 to 410_500 (which can be referred to individually as an LNA 410, or collectively as the LNAs 410), and filters 412_1 to 412_500 (which can be referred to individually as a filter 412, or collectively as the filters 412). The portion of the space segment return link equipment 400A shown in FIG. 4A also includes combiners 414_1 to 414_250 (which can be referred to individually as a combiner 414, or collectively as the combiners 414), frequency down-converters 416_1 to 416_250 (which can be referred to individually as a frequency down-converter 416, or collectively as the frequency down-converters 416), filters

418_1 to 418_250 (which can be referred to individually as a filter 418, or collectively as the filters 418), and local oscillators (LOs) 422_1 to 422_4 (which can be referred to individually as an LO 422, or collectively as the LOs 422). The portion of the space segment return link equipment 400A shown in FIG. 4A also includes combiners 420_1 to 420_125 (which can be referred to individually as a combiner 420, or collectively as the combiners 420).

Each feed horn 402 gathers and focuses radio waves of a service uplink beam (e.g., 106u) and converts them to an RF signal that is provided to a respective OMJ 404. A feed horn 402 and the rest of an antenna can be collectively referred to as the antenna or antenna system. In other words, an antenna, as the term is used herein, can include a feed horn. All or some of the feed horns 402 can share a common reflector. Such reflector(s) is/are not shown in the Figures, to simply the Figures. Each OMJ 404 either passes through a right hand circular polarization (RHCP) or a left hand circular polarization (LHCP) RF signal. Each OMJ 404 can alternatively pass through either a horizontal or a vertical linear polarization RF signal. Each test coupler TC 406 can be used for power monitoring, payload testing and/or performing calibrations based on signals passing therethrough. Each pre-select filter (PF) 408 (e.g., a bandpass filter) is used to remove unwanted frequency components and/or enhance desired frequency components. For an example, each PF 408 can pass frequencies within the range of 29.5-30.0 GHz, but is not limited thereto. Each LNA 410 amplifies the relatively low-power RF signal it receives from a respective PF 408 without significantly degrading the signals signal-to-noise ratio. The amplified RF signal that is output by each LNA 410 is provided to a respective filter 412.

Each filter 412 allows frequencies to pass within one of the colors a, b, c or d. For example, the filter 412_1 passes frequencies within the color a, the filter 412_2 passes the frequencies within the color b, the filter 412_3 passes frequencies within the color c, and the filter 412_4 passes frequencies within the color d. In accordance with an embodiment: color 'a' represents a first sub-band (e.g., 29.50-29.75 GHz) of an allocated uplink frequency band (e.g., 29.50-30.00 GHz) with a right-hand circular polarization (RHCP); color 'b' represents a second sub-band (29.75-30.00 GHz) of the allocated uplink frequency band with RHCP; color 'c' represents the first sub-band (e.g., 29.50-29.75 GHz) of the allocated uplink frequency band with a left-hand circular polarization (LHCP); and color 'd' represents the second sub-band (29.75-30.00 GHz) of the allocated uplink frequency band with LHCP. In other embodiments, the colors may include other allocations of a frequency band and polarization.

Each pair of the filters 412 provide their outputs to a combiner 414. For example, the filters 412_1 and 412_2 provide their outputs to the combiner 414_1, and the filters 414_3 and 414_4 provide their outputs to the combiner 414_2. Each combiner 414 functions as a directional coupler that combines two RF signals into one. For example, the combiner 414_1 combines RF signal having the color a (received from the filter 412_1) and the RF signal having the color b (received from the filter 412_2) into a single RF signal that is provided to the frequency down-converter 416_1. Similarly, the combiner 414_3 combines RF signal having the color c (received from the filter 412_3) and the RF signal having the color d (received from the filter 412_4) into a single RF signal that is provided to the frequency down-converter 416_2. Each combiner 414 can be implemented by a hybrid, but is not limited thereto.

Each frequency down-converter 416 receives an RF signal from a combiner 414 (which RF signal includes data from two service uplink beams, and thus, can be referred to as an RF data signal) and an RF signal from an LO 422 (which can be referred to as an LO signal), and uses the LO signal to down-convert the RF data signal to a frequency range (e.g., 6.70-7.2 GHz, or 6.3-7.2 GHz, or some other frequency range within the 6-12 GHz band) that can be used for transmitting feeder downlink signals (e.g., 102d) to a gateway (e.g., 105). The output of each frequency down-converter 416 is provided to a filter 418. For example, the frequency down-converter 416_1 provides its output to the A,B filter 418_1, and the frequency down-converter 416_1 provides its output to the C,D filter 418_2. The A,B filter 418_1 is a bandpass filter that allows frequencies to pass within the bands associated with colors A and B. The C,D filter 418_2 is a bandpass filter that allows frequencies to pass within the bands associated with colors C and D. In accordance with an embodiment: color 'A' represents a first sub-band (e.g., 6.7-6.95 GHz) of an allocated downlink frequency band (e.g., 6.7-7.2 GHz) with right-hand circular polarization (RHCP); color 'B' represents a second sub-band (e.g., 6.95-7.2 GHz) of the allocated downlink frequency band with RHCP; color 'C' represents the first sub-band (e.g., 6.7-7.95 GHz) of the allocated downlink frequency band with a left-hand circular polarization (LHCP); and color 'D' represents the second sub-band (e.g., 6.95-7.2 GHz) of the allocated uplink frequency band with LHCP. For another example: color 'A' represents a first sub-band (e.g., 6.3-6.75 GHz) of an allocated downlink frequency band (e.g., 6.3-7.2 GHz) with right-hand circular polarization (RHCP); color 'B' represents a second sub-band (e.g., 6.75-7.2 GHz) of the allocated downlink frequency band with RHCP; color 'C' represents the first sub-band (e.g., 6.3-7.75 GHz) of the allocated downlink frequency band with a left-hand circular polarization (LHCP); and color 'D' represents the second sub-band (e.g., 6.75-7.2 GHz) of the allocated uplink frequency band with LHCP. In other embodiments, the colors may include other allocations of a frequency band and polarization.

In the embodiment of FIG. 4A, the outputs of four filters 418 are provided to a combiner 420. For example, the outputs of filters 418_1, 418_2, 418_3 and 418_4 are provided the combiner 420_1. Each combiner 420 combines the four down-converted and filtered signals it receives into a combined signal that includes data modulated RF carriers for eight service uplink beams. In other words, the output of each combiner 420 includes data received from eight service uplink beams associated with at least eight service terminals STs. The output of each combiner 420 is provided to a separate EOM 434, as will be discussed below with reference to FIG. 4D. However, prior to discussing FIG. 4D, FIGS. 4B and 4C will first be used to describe alternative ways in which data modulated RF carriers are produced from multiple (e.g., eight) service uplink beams.

FIG. 4B depicts a portion of space segment return link equipment 400B, according to an embodiment of the present technology. FIG. 4B is similar to FIG. 4A, except that instead of combining the outputs of four filters 418 using a single combiner 420, the outputs of two filters 418 are combined into one signal using a combiner 421, and the outputs of two combiners 421 are combined using a combiner 423. For example, the outputs of filters 418_1, 418_2 are combined using the combiner 421_1, and the outputs of filter 418_3 and 418_4 are combined by the combiner 421_2, and the outputs of the combiners 421_1 and 421_2 are combined by the combiner 423_1. Similar to the case in FIG. 4A, the output of the combiner 423_1 is a combined signal that includes data modulated RF carriers for eight service uplink beams. In other words, the output of each combiner 420 includes data for eight service uplink beams associated with multiple (e.g., eight) service terminals STs. The output of each combiner 423 is provided to a separate EOM 434, as will be discussed below with reference to FIG. 4D.

In the embodiments shown and described with reference to FIGS. 4A and 4B, the frequency down-converters 416 were shown and described as being used to perform frequency conversions within the space segment return link equipment 400A and 400B. In alternative embodiments of the present technology, the frequency down-converters 416 (and the filters 418) are eliminated, in which case the space segment return link equipment 400A and 400B perform no frequency conversions thereby simplifying the space segment return link equipment. In such alternative embodiments, the outputs of the combiners 414 can be provided directly to the combiners 420 (in FIG. 4A) or the combiners 421 (in FIG. 4B). Such alternative embodiments, which eliminate frequency conversion on the return link, provide for less bandwidth on the return link than the embodiments of FIGS. 4A and 4B. Less bandwidth on the return link should typically be acceptable, since a return link typically needs to handle much less bandwidth than a forward link since service terminals STs typically download much more data than they upload. An example of such an alternative embodiment, is shown in FIG. 4C. In the embodiment of FIG. 4C, the outputs of two of the filters 412 are provided to a combiner 414, and the outputs of four of the combiners 414 is provided to a combiner 420. In another embodiment, the outputs of eight of the filters 412 (e.g., the filters 412_1 to 412_8) are all provided directly to a same combiner (e.g., the combiner 420_1). In other words, there can be less cascading of combiners. In still another embodiment, there can be additional cascading of combiners, e.g., in a similar manner as was shown in FIG. 4B.

FIGS. 4A, 4B and 4C were used to described portions of space segment return link equipment (400A or 400B) that produce a data modulated RF carrier for multiple (e.g., eight) service uplink beams associate with multiple (e.g., eight or more) service terminals STs. FIG. 4D will now be used to describe a further portion of the space segment return link equipment 400D that is used to convert the data modulated RF carrier signals into a collimated optical downlink feeder beam that is aimed at a gateway. Referring to FIG. 4D, the portion of the space segment return link equipment 400D is shown as including sixty three lasers 432_1 to 432_63, sixty three electro-optical modulator (EOMs) 434_1 to 434_63, a wavelength-division multiplexing (WDM) multiplexer (MUX) 436, an optical amplifier (OA) 438 and transmitter optics 440. Each of these elements are described below.

The sixty three separate lasers 432_1 to 432_63 each emit light of a different wavelength within a specified wavelength range. The lasers can be referred to individually as a laser 432, or collectively as the lasers 432. Where the specified wavelength range is, for example, from 1560.2 nm to 1575 nm, then the laser 432_1 may emit light having a peak wavelength of 1560.2 nm, the laser 432_2 may emit light having a peak wavelength of 1560.4 nm, the laser 432_3 (not shown) may emit light having a peak wavelength of 1560.6 nm, . . . the laser 432_62 may emit light having a peak wavelength of 1672.6 nm, and the laser 432_63 may emit light having a peak wavelength of 1672.8 nm. In other words, the peak wavelengths emitted by the lasers 432 can occur at 0.2 nm intervals from 1560.2 nm to 1572.8 nm. The wavelength range from 1560.2 nm to 1575 nm, which is within the IR spectrum, is practical to use because IR lasers for use in communications are readily available. However, wider or narrow wavelength ranges, within the same or other parts of the optical spectrum, may alternatively be used. For example, it would also be possible to utilize a wavelength range within the 400 nm-700 nm visible spectrum. It is also possible that the wavelength range that is specified for use in producing the optical feeder downlink beam (e.g., 102d) is non-contiguous. For example, the wavelength range that is for use in producing the optical feeder downlink beam can be from 1535 nm to 1540 nm and from 1565 nm to 1575 nm. These are just a few examples, which are not intended to be all encompassing. Further, it is also possible that space segment return link equipment can alternatively include more or less than sixty three lasers (that each emit light of a different peak wavelength within a specified contiguous or non-contiguous wavelength range). Additionally, it is noted that the space segment return link equipment may include two or more of each of the lasers (that each emit light of a different peak wavelength within a specified contiguous or non-contiguous wavelength range) to provide for redundancy or backup. Each of the lasers 432 can be, for example, a diode-pumped infrared neodymium laser, although the use of other types of lasers are also within the scope of the embodiments described herein.

In accordance with certain embodiments, the space segment return link equipment 400D includes less lasers (e.g., sixty three lasers 432) for use in generating the optical feeder downlink beam that is aimed from the satellite 100 to the gateway 105, than the gateway forward link equipment 200 includes (e.g., five hundred lasers 202) for generating the optical feeder uplink beam that is aimed from the gateway 105 to the satellite 100. This is made possible due to current asymmetric capacity requirements between the forward and return feeder links. More specifically, a feeder downlink beam (e.g., 102d) carries significantly less data than a feeder uplink beam (e.g., 102u), because service terminals STs typically download much more data than they upload.

On the return link, given the current asymmetric capacity requirements between the forward and return links, the space segment return link equipment can be implemented to handle less demand that the ground based forward link equipment. As an example, if each RF service uplink beam is assumed to have only 320 MHz per beam, then a total of 160 GHz needs to be sent from a satellite to a gateway on the optical feeder downlink beam. Several beams' frequencies can be grouped together to create a 4 GHz bandwidth which is then transmitted on each of sixty three laser wavelengths that are multiplexed together and transmitted to the ground. An alternative implementation would be to aggregate the 4 GHz spectrum with filtering post LNA to eliminate the RF frequency conversion and as above directly modulate the RF spectrum on each of the sixty three laser wavelengths. An alternative implementation would be to use only RF LNAs for each feed, modulate each 320 MHz segment of bandwidth onto a single laser and combine two hundred and fifty laser wavelengths together, thus eliminating the need for RF frequency converters. Depending on the number of service beams and feeder beams required, one or the other configuration can be selected to provide the lowest mass solution.

The light emitted by each of the sixty three lasers 432, which can be referred to as an optical carrier signal, is provided (e.g., via a respective optical fiber) to a respective one of the sixty three separate EOMs 434_1 to 434_63. The EOMs can be referred to individually as an EOM 434, or collectively as the EOMs 434. Each of the EOMs 434 is an optical device in which a signal-controlled element exhibiting an electro-optic effect is used to modulate a respective beam of light. The modulation performed by the EOMs 434 may be imposed on the phase, frequency, amplitude, or polarization of a beam of light, or any combination thereof. In accordance with a specific embodiment, each of the EOMs 434 is a phase modulating EOM that is used as an amplitude modulator by using a Mach-Zehnder interferometer. In other words, each of the EOMs 434 can be implemented as a Mach-Zehnder modulator (MZM), which can be a Lithium Niobate Mach-Zehnder modulator, but is not limited thereto. In accordance with specific embodiments, each of the EOMs 434 is implemented as an MZM that produces an amplitude modulated (AM) optical waveform with a modulation index between 10% and 80% in order to maintain fidelity of an RF waveform (modulated therein) without too much distortion. The optical signal that is output by each of the EOMs 434 can be referred to as an optical data signal. The modulation scheme that is implemented by the EOMs 434 can result in double- or vestigial-sidebands, including both an upper sideband (USB) and a lower sideband (LSB). Alternatively single-sideband modulation (SSB) can be utilized to increase bandwidth and transmission power efficiency.

The sixty three separate optical data signals that are output by the sixty three EOMs 434 are provided to the WDM MUX 436, which can also be referred to as a dense wavelength division multiplexing (DWDM) MUX. The WMD MUX 436 multiplexes (i.e., combines) the sixty three optical data signals, received from the sixty three EOMs 434, onto a single optical fiber, with each of the sixty three separate optical data signals being carried at the same time on its own separate optical wavelength within a specified contiguous wavelength range (e.g., from 1560 nm to 1575 nm) or non-contiguous wavelength range (e.g., from 1510 nm to 1534.8 nm, and from 1540.2 nm to 1564.8 nm). For example, as explained above, the sixty three optical data signals can have peak wavelengths that occur at 0.2 nm intervals from 1560 nm to 1572.8 nm.

The signal that is output by the WMD MUX 436, which can be referred to as a wavelength division multiplexed optical signal, is provided to the optical amplifier (OA) 438. The OA 438 amplifies the wavelength division multiplexed optical signal so that the wavelength division multiplexed optical signal has sufficient power to enable transmission thereof from the satellite 100 in free-space to the gateway 105. The OA 438 can be an erbium-doped fiber amplifier (EDFA), but is not limited thereto. The output of the OA 438 can be referred to as an optically amplified wavelength division multiplexed optical signal.

The optically amplified wavelength division multiplexed optical signal, which is output by the OA 438, is provided (e.g., via an optical fiber) to the transmitter optics 440. The transmitter optics 440, which can also be referred to as a telescope, can includes optical elements such as lenses, mirrors, reflectors, filters and/or the like. The transmitter optics 440 outputs a collimated optical feeder downlink beam that is aimed at a satellite. A gimbal, and/or the like, can be used to control the steering of the transmitter optics 440. In accordance with an embodiment, the collimated optical feeder downlink beam has an aperture of about 40 cm, and a half beam divergence of about 0.0000012 radians, wherein the term "about" as used herein means+/−10 percent of a specified value. The use of other apertures and half beam divergence values are also within the scope of the embodiments described herein. The collimated optical feeder downlink beam, which is output by the transmitter optics 440, is transmitted in free-space to receiver optics in the gateway 105.

A space segment (e.g., a satellite 100) can have different optics that are used for transmitting an optical feeder downlink beam (e.g., 102d) to a gateway, than the optics that are used for receiving an optical feeder uplink beam (e.g., 102u) from a gateway. Alternatively, and preferably, to reduce the weight that needs to be carried by the space segment (e.g., a satellite 100), the same optics can be used for both transmitting an optical feeder downlink beam (e.g., 102d) to a gateway and for receiving an optical feeder uplink beam (e.g., 102u) from a gateway. More specifically, the TX optics 440 shown in FIG. 4D can be the same as the RX optics 302 shown in FIG. 3. Additional and/or alternative components can be shared between the space segment forward link equipment shown in FIG. 3 and the space segment return link equipment shown in FIGS. 4A, 4B and 4D. For example, the feed horns 326 in FIG. 3 can be the same as the feed horns 402 shown in FIGS. 4A and 4B. For another example, the OMJs 324 in FIG. 3 can be the same as the OMJs 404 in FIGS. 4A and 4B, if the OMJs are implement as a three-port device. These are just a few example, which are not intended to be all encompassing.

Referring again to the EOMs 434 in FIG. 4D, in accordance with certain embodiments of the present technology, each of the EOMs 434 modulates the optical signal it receives (e.g., via an optical fiber from a respective laser 432) with a separate RF signal that has already been modulated to include user data. For example, the EOM 434_1 modulates the optical signal it receives from the laser 431_1 with a data modulated RF carrier signal it receives from the combiner 420_1 (in FIG. 4A) or from the combiner 423_1 (in FIG. 4B). The data modulated RF carrier signal that the EOM 434_1 receives from a combiner (420_1 in FIG. 4A, or 423_1 in FIG. 4B) can include data corresponding to eight service uplink beams received from service terminals STs. Similarly, the EOMs 434_2 to 434_62 can each receive a different data modulated RF carrier signal, from a different combiner 420 or 423, with each data modulated RF carrier signal corresponding to a different group of eight service uplink beams received from service terminals STs. The EOM 434_63 can receive a data modulated RF carrier signal, from a combiner 420 or 423, wherein the data modulated RF carrier signal corresponds to four service uplink beams received from service terminals STs. In this manner, the EOMs 434 can be collectively provided with data modulated RF carrier signals corresponding to five hundred service uplink beams (i.e., 62*8+1*4=500).

Gateway Return Link Equipment

Figure 5:
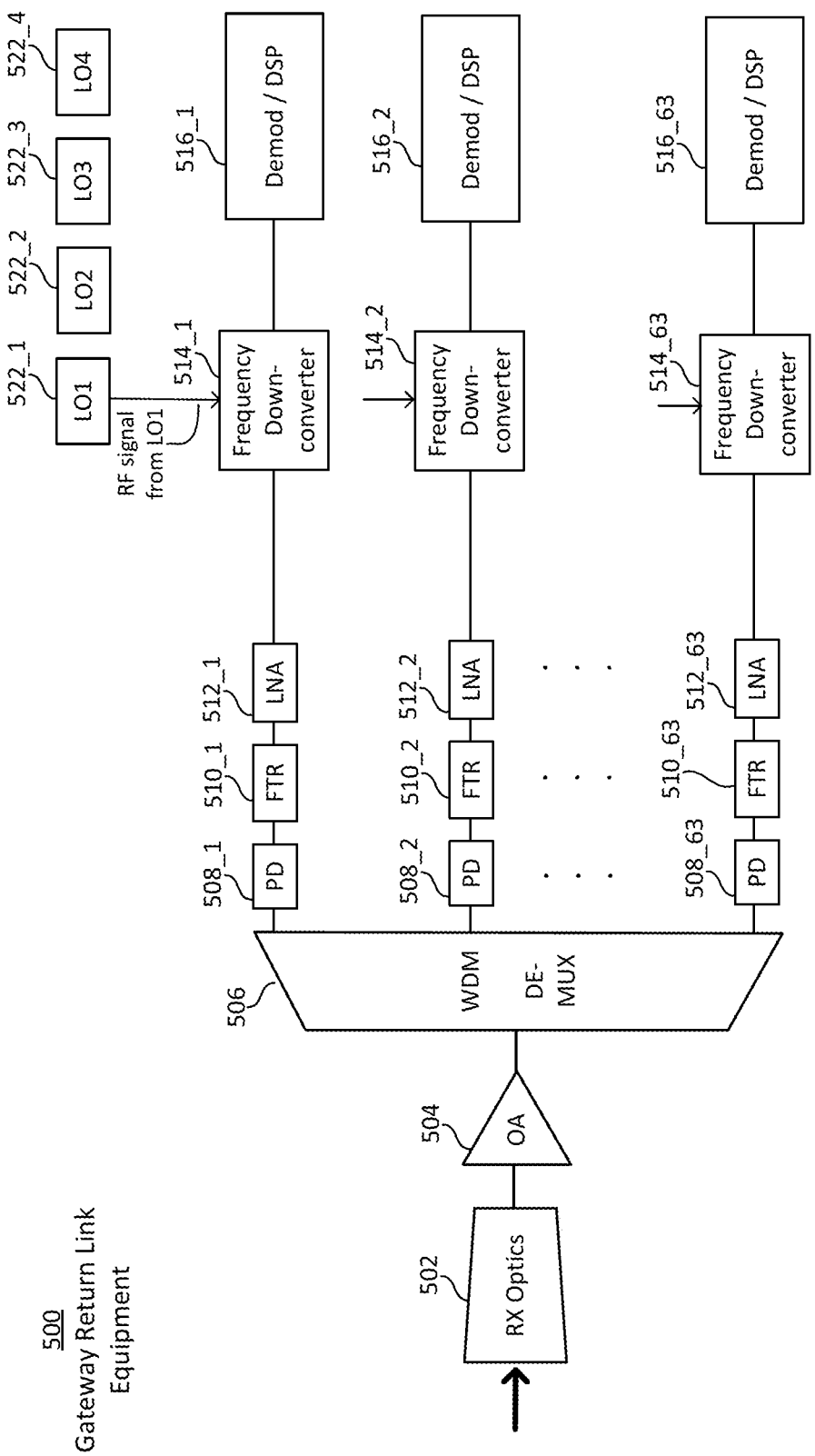
FIG. 5 depicts gateway return link equipment, according to an embodiment of the present technology.

FIG. 5 will now be used to describe gateway return link equipment 500, according to an embodiment of the present technology. Such gateway return link equipment 500 can also be referred to as an optical gateway return link subsystem 500, or more generally, as an optical communication subsystem. Referring to FIG. 5, the optical gateway return link subsystem 500 is shown as including receiver optics 502, an optical amplifier (OA) 504, a wavelength-division multiplexing (WDM) demultiplexer (DEMUX) 506, sixty three photodetectors (PDs) 508_1 to 508_63, sixty three filters 510_1 to 510_63, sixty three low noise amplifiers (LNAs) 512_1 to 512_63, and sixty three frequency down-converters 514_1 to 514_63. The optical gateway return link subsystem 500 is also shown as including sixty three demodulator and digital signal processor (DSP) blocks 516_1 to 516_63, and four local oscillators (LOs) 522_1 to 522_4 (which can be referred to individually as an LO 522, or collectively as the LOs 522).

The receiver optics 502, which can also be referred to as a telescope, can includes optical elements such as mirrors, reflectors, filters and/or the like. The receiver optics 502 receives the optical feeder downlink beam (e.g., 102d) that is transmitted through free-space from a space segment (e.g., a satellite 100), by the space based return link subsystem 400C (or 400A or 400B) and 400D, and provides the received optical feeder downlink beam (e.g., via an optical fiber) to the OA 504. A gimbal, and/or the like, can be used to control the steering of the receiver optics 502. When the optical feeder downlink beam reaches the gateway, the power of the optical feeder downlink beam is significantly attenuated compared to when it was transmitted by the space based return link subsystem. Accordingly, the OA 504 is used to amplify the received optical feeder downlink beam before it is provided to the WDM DEMUX 506. The OA 504 can be, e.g., an erbium-doped fiber amplifier (EDFA), but is not limited thereto. The output of the OA 504 can be referred to as an optically amplified received optical feeder downlink beam. The WDM DEMUX 506 demultiplexes (i.e., separates) the received optical feeder uplink beam (after it has been optically amplified) into sixty three separate optical signals, each of which is provided to a separate photodetector (PD) 508. Each PD 508 converts the optical signal it receives from the WDM DEMUX 506 to a respective RF electrical signal. The RF electrical signal produced by each PD 508 is provided to a respective filter (FTR) 510 (e.g., a bandpass filter) to remove unwanted frequency components and/or enhance desired frequency components. For an example, where frequency down-conversions were performed on the satellite (by the space segment return link equipment 400A or 400B), each filter 510 can pass frequencies within the range of 6.70-7.2 GHz, or within the range of 6.3-7.2 GHz, but are not limited thereto. For another example, where frequency down-conversions were not performed on the satellite (e.g., by the space segment return link equipment 400C), each filter 510 can pass frequencies within the range of 29.5-30 GHz, but are not limited thereto. The filtered RF electrical signal, which is output by each filter 408, is provided to a respective low noise amplifier (LNA) 512. Each LNA 512 amplifies the relatively low-power RF signal it receives from a respective filter 510 without significantly degrading the signals signal-to-noise ratio. The amplified RF signal that is output by each LNA 512 is provided to a respective frequency down-converter 514, the output of which is provided to a respective demodulator and DSP block 516.

Each frequency down-converter 514 receives an RF signal from an LNA 512 (which RF signal includes data from subscriber terminals STs, and thus, can be referred to as an RF data signal) and an RF signal from an LO 452 (which can be referred to as an LO signal), and uses the LO signal to down-convert the RF data signal to baseband. The baseband data signal output by each frequency down-converter 514 is provided to a respective demodulator and DSP block 516. Each demodulator and DSP block 516 demodulates the baseband data signal it receives, and performs digital signal processing thereon. Such a demodulated data signal can be used to provide data to, or request data from, a server, client and/or the like that is coupled to a network (e.g., the network 140 in FIG. 1).

A gateway (e.g., 105) can have different optics that are used for transmitting an optical feeder uplink beam (e.g., 102u) to a space segment (e.g., satellite 100), than the optics that are used for receiving an optical feeder downlink beam (e.g., 102d) from a space segment. Alternatively, a gateway can use the same optics for both transmitting an optical feeder uplink beam (e.g., 102u) to a space segment and for receiving an optical feeder downlink beam (e.g., 102d) from a space segment. More specifically, the RX optics 502 shown in FIG. 5 can be the same as the TX optics 210 shown in FIG. 2A.

Methods

FIG. 6 will now be used to summarize methods for enabling a ground based subsystem (e.g., the gateway forward link equipment 200 in FIG. 2A) to produce and transmit an optical feeder uplink beam (e.g., 102u in FIG. 1) to a satellite (e.g., 100 in FIG. 1) that is configured to receive the optical feeder uplink beam and in dependence thereon produce and transmit a plurality of RF service downlink beams (e.g., 106d, 110d, 114d and 118d in FIG. 1) within a specified RF frequency range to service terminals STs. In accordance with certain embodiments, the specified RF frequency range within which the satellite is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Referring to FIG. 6, step 602 involves emitting a plurality of optical signals (e.g., two hundred and fifty optical signals) each having a different peak wavelength that is within a specified optical wavelength range. Step 602 can be performed using the lasers 202 discussed above with reference to FIG. 2A. The specified optical wavelength range may be within the C-band and/or L-band optical wavelengths, as explained above. Further, as explained above, the specified optical wavelength range can be a contiguous optical wavelength range within an IR spectrum, or a non-contiguous optical wavelength range within the IR spectrum. As noted above, visible and/or other optical wavelengths may alternatively be used.

Step 604 involves electro-optically modulating each of the optical signals with one of a plurality of different data modulated RF carrier signals, each of which has been modulated to carry data for at least one of the plurality of RF service downlink beams, to thereby produce a plurality of optical data signals, each of which carries data for at least one of the plurality of RF service downlink beams and has an RF frequency within the same specified RF frequency range within which the satellite is configured to transmit the plurality of RF service downlink beams. Step 604 can be performed using the EOMs 204 discussed above with reference to FIG. 2A.

Step 606 involves multiplexing the plurality of optical data signals to thereby produce a wavelength division multiplexed optical signal that includes data for the plurality of RF service downlink beams. Step 606 can be performed using the WDM MUX 206 discussed above with reference to FIG. 2A.

Step 608 involves producing an optical feeder uplink beam, in dependence on the wavelength division multiplexed optical signal, and step 610 involves transmitting the optical feeder uplink beam through free-space to the satellite. Steps 608 and 610 can be performed by the transmitter optics 210 discussed above with reference to FIG. 2A. The optical amplifier (OA) 208 discussed above with reference to FIG. 2A can also be used to perform step 608.

Beneficially, because the RF frequencies of the optical data signals produced during the electro-optically modulating step 604 are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam. In other words, the space segment forward link equipment 300 in FIG. 3 beneficially does not need any frequency down-converters or any other type of frequency conversion equipment.

A method can also include receiving a plurality of RF carrier signals each of which has a different RF frequency within the same specified RF frequency range within which the satellite is configured to transmit the plurality of RF service downlink beams, and producing the modulated RF signals, which are electro-optically modulated with the optical signals, in dependence on the plurality of RF carrier signals. The RF carrier signals can be produce by one or more local oscillators 222 discussed above with reference to FIG. 2B. The modulated RF signals can be produced by RFMs 224 discussed above with reference to FIG. 2B.

FIG. 7 will now be used to summarize methods for enabling a space based subsystem (e.g., the space segment forward link equipment 300 of FIG. 3) of a satellite (e.g., 100) to produce and transmit a plurality of RF service downlink beams (e.g., 106*d*, 110*d*, 114*d* and 118*d* in FIG. 1) within a specified RF frequency range to service terminals STs. In accordance with certain embodiments, the specified RF frequency range within which the satellite is configured to produce and transmit a plurality of RF service downlink beams is a downlink portion of the Ka band. The downlink portion of the Ka band can be from 17.7 GHz to 20.2 GHz, and thus, have a bandwidth of 2.5 GHz. Alternatively, the downlink portion of the Ka band can be from 17.3 GHz to 20.2 GHz, and thus, have a bandwidth of 2.9 GHz. These are just a few examples, which are not intended to be all encompassing.

Referring to FIG. 7, step 702 involves receiving an optical feeder uplink beam (e.g., 102*u*) from a ground based subsystem (e.g., the gateway forward link equipment 200 in FIG. 2A). Step 702 can be performed by the receiver optics 302 described above with reference to FIG. 3.

Step 704 involves producing, in dependence on the received optical feeder uplink beam, a plurality of (e.g., two hundred and fifty) separate optical signals that each have a different peak wavelength. Step 704 can be performed by the WDM-DEMUX 306 described above with reference to FIG. 3.

Step 706 involves converting each of the separate optical signals into a respective electrical data signal having an RF frequency within the same specified RF frequency range within which the space based subsystem is configured to transmit the plurality of RF service downlink beams. Step 706 can be performed by the PDs 308 discussed above with reference to FIG. 3.

Step 708 involves producing, in dependence on the electrical data signals, the plurality of RF service downlink beams within the specified RF frequency range. Step 708 can be performed, e.g., by the filters 310, LNAs 312, splitters 314, HPAs 318, HFs 320, OMJs 324, and feed horns 326 discussed above with reference to FIG. 3.

Step 710 involves transmitting the plurality of RF service downlink beams within the specified RF frequency range.

Step 710 can be performed by the feed horns 326 discussed above with reference to FIG. 3, and more generally, antenna systems.

Beneficially, because the RF frequencies of the electrical data signals resulting from the converting step 706 are within the same specified RF frequency range within which the space based subsystem is configured to transmit the plurality of RF service downlink beams, there is an elimination of any need for the space based subsystem (e.g., the space segment forward link equipment 300 in FIG. 3) to perform any frequency conversions when producing the plurality of RF service downlink beams in dependence on the optical feeder uplink beam. In other words, beneficially the space segment forward link equipment 300 in FIG. 3 does not need any frequency down-converters or any other type of frequency conversion equipment.

Figure 8:
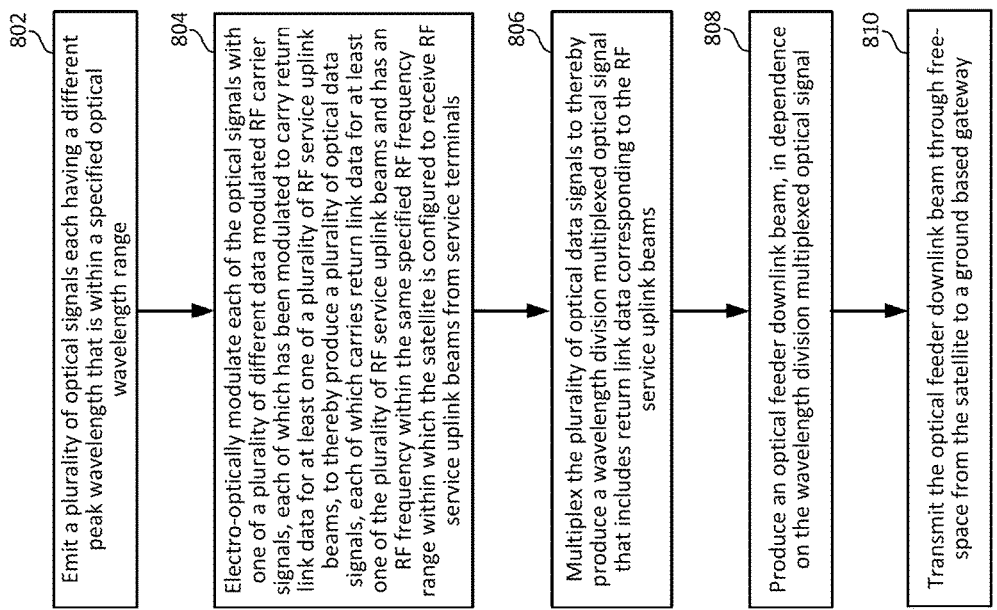
FIG. 8 is a high level flow diagram that is used to summarize methods for enabling a space based subsystem of a satellite to produce and transmit an optical feeder downlink beam, according to certain embodiments of the present technology.

FIG. 8 is a high level flow diagram that is used to summarize methods for enabling a space based subsystem of a satellite to produce and transmit an optical feeder downlink beam (e.g., 102*d*) within a specified optical wavelength range, according to certain embodiments of the present technology. More specifically, certain methods described with reference to FIG. 8 enable a space based subsystem of a satellite (e.g., 100) to produce and transmit an optical feeder downlink beam in dependence on RF service uplink beams received from service terminals within a specified RF frequency range. The specified optical wavelength range may be within the C-band and/or L-band optical wavelengths, but are not limited thereto. Further, as explained above, the specified optical wavelength range can be a contiguous optical wavelength range within an IR spectrum, or a non-contiguous optical wavelength range within the IR spectrum. As noted above, visible and/or other optical wavelengths may alternatively be used.

Referring to FIG. 8, step 802 involves emitting a plurality of optical signals (e.g., sixty three optical signal) each having a different peak wavelength that is within a specified optical wavelength range. Step 802 can be performed by the lasers 432 discussed above with reference to FIG. 4D.

Step 804 involves electro-optically modulating each of the optical signals with one of a plurality of different data modulated RF carrier signals, each of which has been modulated to carry return link data for at least one of a plurality of RF service uplink beams, to thereby produce a plurality of optical data signals, each of which carries return link data for at least one of the plurality of RF service uplink beams and has an RF frequency within the same specified RF frequency range within which the satellite is configured to receive RF service uplink beams from service terminals. Step 804 can be performed by the EOMs 434 discussed above with reference to FIG. 4D.

Step 806 involves multiplexing the plurality of optical data signals to thereby produce a wavelength division multiplexed optical signal that includes return link data corresponding to the RF service uplink beams. Step 806 can be performed by the WDM multiplexer 436 discussed above with reference to FIG. 4D.

Step 808 involves producing an optical feeder downlink beam, in dependence on the wavelength division multiplexed optical signal, and step 810 involves transmitting the optical feeder downlink beam through free-space from the satellite to a ground based gateway. Steps 808 and 810 can be performed by the transmitter optics 440 discussed above with reference to FIG. 4D.

In accordance with certain embodiments, where RF frequencies of the optical data signals produced during the electro-optically modulating are within the same specified RF frequency range within which the satellite is configured to receive RF service uplink beams from service terminals, there is an elimination of any need for the satellite to perform any frequency conversions when producing the optical feeder downlink beam in dependence on the RF service uplink beams. In other words, in such embodiments, the space segment return link equipment beneficially does not need any frequency down-converters or any other type of frequency conversion equipment. The space segment return link equipment 400C (in FIG. 4C) and 400D (in FIG. 4D), for example, can be used to producing an optical feeder downlink beam without the need for the satellite to perform any frequency conversions. In accordance with certain embodiments, the specified RF frequency range within which the satellite is configured to receive RF service uplink beams from service terminals is an uplink portion of the Ka band. The uplink portion of the Ka band can be from 29.5-30 GHz, and thus, have a bandwidth of 0.5 GHz. This is just an example, which are not intended to be all encompassing.

A method can also include receiving a plurality of RF service uplink beams, and producing the plurality of data modulated RF carrier signals that have been modulated to carry the return link data corresponding to the RF service uplink beams received from the service terminals.

Further details of the methods described with reference to FIGS. 6, 7 and 8 can be appreciated from the above description of FIGS. 1-5.

Certain embodiments of the present technology described above relate to a ground based subsystem for use in transmitting an optical feeder uplink beam to a satellite that is configured to receive the optical feeder uplink beam and in dependence thereon produce and transmit a plurality of RF service downlink beams within a specified RF frequency range to service terminals. In accordance with certain embodiments, the ground based subsystem includes a plurality of lasers, a plurality of electro-optical modulators (EOMs), a wavelength-division multiplexing (WDM) multiplexer, and an optical amplifier and transmitter optics. Each of the lasers is operable to emit an optical signal having a different peak wavelength within a specified optical wavelength range. Each of the EOMs is configured to receive an optical signal from a respective one of the plurality of lasers, receive a different data modulated RF carrier signal that has been modulated to carry data for at least one of the plurality of RF service downlink beams, and output an optical data signal carrying data for at least one of the plurality of RF service downlink beams and having an RF frequency within the same specified RF frequency range within which the satellite is configured to transmit the plurality of RF service downlink beams. The WDM multiplexer is configured to receive the optical data signals output by the plurality of EOMs, and combine the plurality of optical data signals into a wavelength division multiplexed optical signal. The optical amplifier is configured to amplify the wavelength division multiplexed optical signal to thereby produce an optically amplified wavelength division multiplexed optical signal. The transmitter optics are configured to receive the optically amplified wavelength division multiplexed optical signal and transmit an optical feeder uplink beam to the satellite in dependence thereon. In accordance with specific embodiments, because RF frequencies of the optical data signals output by the plurality of EOMs are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam. In accordance with certain embodiments, the specified RF frequency range within which the satellite is configured to produce and transmit the plurality of RF service downlink beams comprises a downlink portion of the Ka band. For example, the downlink portion of the Ka band can be from 17.7 GHz to 20.2 GHz, and thus, has a bandwidth of 2.5 GHz. Alternatively, the downlink portion of the Ka band can be from 17.3 GHz to 20.2 GHz, and thus, has a bandwidth of 2.9 GHz. Other variations are also possible, and within the scope of the embodiments described herein. In accordance with certain embodiments, the specified optical wavelength range is a contiguous optical wavelength range within an infrared (IR) spectrum. Alternatively, the specified optical wavelength range is a non-contiguous optical wavelength range within an infrared (IR) spectrum. The use of other wavelength ranges, including those within the visible spectrum, can alternatively be used while still being within the scope of the embodiments described herein.

In accordance with certain embodiments, the ground based subsystem can also include a plurality of RF modulators configured to produce the data modulated RF carrier signals that are received by the plurality of EOMs. Each of the RF modulators can receive an RF carrier signal having an RF frequency within the same specified RF frequency range within which the satellite is configured to transmit the plurality of RF service downlink beams. The ground based subsystem can also include one or more oscillators configured to produce the RF carrier signals that are provided to the RF modulators, wherein each of the RF carriers signals has an RF frequency within the same specified RF frequency range within which the satellite is configured to transmit the plurality of RF service downlink beams.

In accordance with certain embodiments, the ground based subsystem can include a plurality of RF modulators that are each used to produce a data modulated RF signal within the same specified RF frequency range within which the satellite is configured to transmit the plurality of RF service downlink beams. Additionally, the ground based subsystem can include a plurality of frequency division multiplexers (FDMs) that are each configured to receive the data modulated RF signals from at least two of the RF modulators and frequency multiplex the received modulated RF signals to produce one of the data modulated RF carrier signals that are received by the EOMs. The ground based can also include one or more oscillators configured to produce the RF carrier signals that are provided to the RF modulators, wherein each of the RF carriers signals has an RF frequency within the same specified RF frequency range within which the satellite is configured to transmit the plurality of RF service downlink beams. In accordance with certain embodiments, each of the EOMs is configured to output an optical data signal carrying data for at least two of the plurality of RF service downlink beams.

Certain embodiments of the present technology described above relate to methods for enabling a ground based subsystem to produce and transmit an optical feeder uplink beam to a satellite that is configured to receive the optical feeder uplink beam and in dependence thereon produce and transmit a plurality of RF service downlink beams within a specified RF frequency range to service terminals. Such a method can include emitting a plurality of optical signals each having a different peak wavelength that is within a specified optical wavelength range. Such a method can also include electro-optically modulating each of the optical signals with one of a plurality of different data modulated RF carrier signals, each of which has been modulated to carry data for at least one of the plurality of RF service downlink beams, to thereby produce a plurality of optical data signals, each of which carries data for at least one of the plurality of RF service downlink beams and has an RF frequency within the same specified RF frequency range within which the satellite is configured to transmit the plurality of RF service downlink beams. The method can also include multiplexing the plurality of optical data signals to thereby produce a wavelength division multiplexed optical signal that includes data for the plurality of RF service downlink beams. Additionally, the method can include producing an optical feeder uplink beam, in dependence on the wavelength division multiplexed optical signal, and transmitting the optical feeder uplink beam through free-space to the satellite. In accordance with certain embodiments, because RF frequencies of the optical data signals produced during the electro-optically modulating are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam. In accordance with certain embodiments, the specified RF frequency range within which the satellite is configured to produce and transmit the plurality of RF service downlink beams comprises a downlink portion of the Ka band. For example, the downlink portion of the Ka band can be from 17.7 GHz to 20.2 GHz, and thus, has a bandwidth of 2.5 GHz. Alternatively, the downlink portion of the Ka band can be from 17.3 GHz to 20.2 GHz, and thus, has a bandwidth of 2.9 GHz. Other variations are also possible, and within the scope of the embodiments described herein. In accordance with certain embodiments, the specified optical wavelength range is a contiguous optical wavelength range within an infrared (IR) spectrum. Alternatively, the specified optical wavelength range is a non-contiguous optical wavelength range within an infrared (IR) spectrum. The use of other wavelength ranges, including those within the visible spectrum, can alternatively be used while still being within the scope of the embodiments described herein.

Certain methods can also include receiving a plurality of RF carrier signals each of which has a different RF frequency within the same specified RF frequency range within which the satellite is configured to transmit the plurality of RF service downlink beams. Further, a method can also include producing the data modulated RF carrier signals, which are electro-optically modulated with the optical signals, in dependence on the plurality of RF carrier signals.

Certain embodiments of the present technology described above relate to a space based subsystem of a satellite for use in transmitting a plurality of RF service downlink beams within a specified RF frequency range to service terminals. The space based subsystem can include receiver optics, an optical amplifier, a WDM demultiplexer, a plurality of photodetectors, and RF components and antennas. The receiver optics are configured to receive an optical feeder uplink beam, within a specified optical wavelength range, from a ground based subsystem. The optical amplifier is optically coupled to the receiver optics and configured to amplify an optical feeder uplink signal that is output from the receiver optics. The WDM demultiplexer is optically coupled to the optical amplifier and configured to separate the amplified optical feeder uplink signal, which is output from the optical amplifier, into a plurality of separate optical signals that each have a different peak wavelength. Each of the photodetectors converts a different one of the optical signals that are output from the WDM demultiplexer, to a respective electrical data signal having an RF frequency within the same specified RF frequency range within which the space based subsystem is configured to transmit the plurality of RF service downlink beams. The RF components and antennas are configured to produce and transmit, in dependence on the electrical data signals generated by the plurality of PDs, the plurality of RF service downlink beams within the specified RF frequency range. In accordance with certain embodiments, because the RF frequencies of the electrical data signals output by the plurality of photodetectors are within the same specified RF frequency range within which the space based subsystem is configured to transmit the plurality of RF service downlink beams, there is an elimination of any need for the space based subsystem to perform any frequency conversions when producing the plurality of RF service downlink beams in dependence on the optical feeder uplink beam. In accordance with certain embodiments, the specified RF frequency range within which the satellite is configured to produce and transmit the plurality of RF service downlink beams comprises a downlink portion of the Ka band. For example, the downlink portion of the Ka band can be from 17.7 GHz to 20.2 GHz, and thus, has a bandwidth of 2.5 GHz. Alternatively, the downlink portion of the Ka band can be from 17.3 GHz to 20.2 GHz, and thus, has a bandwidth of 2.9 GHz. Other variations are also possible, and within the scope of the embodiments described herein. In accordance with certain embodiments, the specified optical wavelength range is a contiguous optical wavelength range within an infrared (IR) spectrum. Alternatively, the specified optical wavelength range is a non-contiguous optical wavelength range within an infrared (IR) spectrum. The use of other wavelength ranges, including those within the visible spectrum, can alternatively be used while still being within the scope of the embodiments described herein.

Certain embodiments of the present technology described above relate to methods for enabling a space based subsystem of a satellite to produce and transmit a plurality of RF service downlink beams within a specified RF frequency range to service terminals. Such a method can include receiving an optical feeder uplink beam within a specified optical wavelength range from a ground based subsystem. Such a method can also include producing, in dependence on the received optical feeder uplink beam, a plurality of separate optical signals that each have a different peak wavelength. Additionally, the method can include converting each of the separate optical signals into a respective electrical data signal having an RF frequency within the same specified RF frequency range within which the space based subsystem is configured to transmit the plurality of RF service downlink beams. The method can also include producing, in dependence on the electrical data signals, the plurality of RF service downlink beams within the specified RF frequency range, and transmitting the plurality of RF service downlink beams within the specified RF frequency range. In accordance with certain embodiments, because the RF frequencies of the electrical data signals resulting from the converting are within the same specified RF frequency range within which the space based subsystem is configured to transmit the plurality of RF service downlink beams, there is an elimination of any need for the space based subsystem to perform any frequency conversions when producing the plurality of RF service downlink beams in dependence on the optical feeder uplink beam. In accordance with certain embodiments, the specified RF frequency range within which the satellite is configured to produce and transmit the plurality of RF service downlink beams comprises a downlink portion of the Ka band. For example, the downlink portion of the Ka band can be from 17.7 GHz to 20.2 GHz, and thus, has a bandwidth of 2.5 GHz. Alternatively, the downlink portion of the Ka band can be from 17.3 GHz to 20.2 GHz, and thus, has a bandwidth of 2.9 GHz. Other variations are also possible, and within the scope of the embodiments described herein. In accordance with certain embodiments, the specified optical wavelength range is a contiguous optical wavelength range within an infrared (IR) spectrum. Alternatively, the specified optical wavelength range is a non-contiguous optical wavelength range within an infrared (IR) spectrum. The use of other wavelength ranges, including those within the visible spectrum, can alternatively be used while still being within the scope of the embodiments described herein.

Certain embodiments of the present technology described above relate to a space based subsystem of a satellite for use in producing an optical feeder downlink beam in dependence on RF service uplink beams received from service terminals within a specified RF frequency range. The space based subsystem can include a plurality of lasers, a plurality of EOMs, a WDM multiplexer, an optical amplifier, and transmitter optics. Each of the lasers is operable to emit an optical signal having a different peak wavelength within a specified optical wavelength range. Each of the EOMs is configured to receive an optical signal from a respective one of the plurality of lasers, receive a different data modulated RF carrier signal that has been modulated to carry return link data corresponding to a plurality of RF service uplink beams received from a plurality of service terminals, and output an optical data signal carrying return link data corresponding to the plurality of RF service uplink beams and having an RF frequency within the same specified RF frequency range within which the satellite is configured to receive RF service uplink beams from service terminals. The WDM multiplexer is configured to receive the optical data signals output by the plurality of EOMs, and combine the plurality of optical data signals into a wavelength division multiplexed optical signal. The optical amplifier is configured to amplify the wavelength division multiplexed optical signal to thereby produce an optically amplified wavelength division multiplexed optical signal. The transmitter optics are configured to receive the optically amplified wavelength division multiplexed optical signal and transmit an optical feeder downlink beam to a ground based subsystem in dependence thereon. In accordance with certain embodiments, because RF frequencies of the optical data signals output by the plurality of EOMs are within the same specified RF frequency range within which the satellite is configured to receive RF service uplink beams from service terminals, there is an elimination of any need for the satellite to perform any frequency conversions when producing the optical feeder downlink beam in dependence on RF service uplink beams. The space based subsystem can also include antennas and RF components configured to receive RF service uplink beams from service terminals and produce the data modulated RF carrier signals that are provided to the EOMs and used by the EOMs to produce the optical data signals that are provided by the EOMs to the WDM multiplexer. In accordance with certain embodiments, the specified RF frequency range within which the satellite is configured to receive the plurality of RF service uplink beams comprises an uplink portion of the Ka band. The uplink portion of the Ka band can be, e.g., from 29.5 to 30 GHz, and thus, have a bandwidth of 0.5 GHz. Other variations are also possible, and within the scope of the embodiments described herein. In accordance with certain embodiments, the specified optical wavelength range is a contiguous optical wavelength range within an infrared (IR) spectrum. Alternatively, the specified optical wavelength range is a non-contiguous optical wavelength range within an infrared (IR) spectrum. The use of other wavelength ranges, including those within the visible spectrum, can alternatively be used while still being within the scope of the embodiments described herein.

Certain embodiments of the present technology described above relate to methods for enabling a space based subsystem of a satellite to produce and transmit an optical feeder downlink beam in dependence on RF service uplink beams received from service terminals within a specified RF frequency range. Such a method can include emitting a plurality of optical signals each having a different peak wavelength that is within a specified optical wavelength range. The method can also include electro-optically modulating each of the optical signals with one of a plurality of different data modulated RF carrier signals, each of which has been modulated to carry return link data for at least one of a plurality of RF service uplink beams, to thereby produce a plurality of optical data signals, each of which carries return link data for at least one of the plurality of RF service uplink beams and has an RF frequency within the same specified RF frequency range within which the satellite is configured to receive RF service uplink beams from service terminals. The method can further include multiplexing the plurality of optical data signals to thereby produce a wavelength division multiplexed optical signal that includes return link data corresponding to the RF service uplink beams. The method can also include producing an optical feeder downlink beam, in dependence on the wavelength division multiplexed optical signal, and transmitting the optical feeder downlink beam through free-space from the satellite to a ground based gateway. In accordance with certain embodiments, because RF frequencies of the optical data signals produced during the electro-optically modulating are within the same specified RF frequency range within which the satellite is configured to receive RF service uplink beams from service terminals, there is an elimination of any need for the satellite to perform any frequency conversions when producing the optical feeder downlink beam in dependence on the RF service uplink beams. The method can additionally include receiving the plurality of RF service uplink beams, and producing the plurality of data modulated RF carrier signals that have been modulated to carry the return link data corresponding to the RF service uplink beams received from the service terminals.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A ground based subsystem for use in transmitting an optical feeder uplink beam to a satellite that is configured to receive the optical feeder uplink beam and in dependence thereon produce and transmit a plurality of RF service downlink beams within a specified RF frequency range to service terminals, the ground based subsystem comprising:

a plurality of lasers, each of the lasers operable to emit an optical signal having a different peak wavelength within a specified optical wavelength range;

a plurality of electro-optical modulators (EOMs), each of the EOMs configured to receive an optical signal from a respective one of the plurality of lasers, receive a different data modulated RF carrier signal that has been modulated to carry data for at least one of the plurality of RF service downlink beams, and output an optical data signal carrying data for at least one of the plurality of RF service downlink beams and having an RF frequency within the same specified RF frequency range within which the satellite is configured to transmit the plurality of RF service downlink beams;

a wavelength-division multiplexing (WDM) multiplexer configured to receive the optical data signals output by the plurality of EOMs, and combine the plurality of optical data signals into a wavelength division multiplexed optical signal;

an optical amplifier configured to amplify the wavelength division multiplexed optical signal to thereby produce an optically amplified wavelength division multiplexed optical signal; and transmitter optics configured to receive the optically amplified wavelength division multiplexed optical signal and transmit an optical feeder uplink beam to the satellite in dependence thereon;

wherein because RF frequencies of the optical data signals output by the plurality of EOMs are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam.

2. The subsystem of claim 1, further comprising:
a plurality of RF modulators configured to produce the data modulated RF carrier signals that are received by the plurality of EOMs;
wherein each of the RF modulators receives an RF carrier signal having an RF frequency within the same specified RF frequency range within which the satellite is configured to transmit the plurality of RF service downlink beams.

3. The subsystem of claim 2, further comprising:
one or more oscillators configured to produce the RF carrier signals that are provided to the RF modulators, each of the RF carriers signals having an RF frequency within the same specified RF frequency range within which the satellite is configured to transmit the plurality of RF service downlink beams.

4. The subsystem of claim 1, further comprising:
a plurality of RF modulators that are each used to produce a data modulated RF signal within the same specified RF frequency range within which the satellite is configured to transmit the plurality of RF service downlink beams;
a plurality of frequency division multiplexers that are each configured to receive the data modulated RF signals from at least two of the RF modulators and frequency multiplex the received modulated RF signals to produce one of the data modulated RF carrier signals that are received by the EOMs; and
one or more oscillators configured to produce the RF carrier signals that are provided to the RF modulators, each of the RF carriers signals having an RF frequency within the same specified RF frequency range within which the satellite is configured to transmit the plurality of RF service downlink beams.

5. The subsystem of claim 1, wherein:
each of the EOMs is configured to output an optical data signal carrying data for at least two of the plurality of RF service downlink beams.

6. The subsystem of claim 1, wherein the specified RF frequency range within which the satellite is configured to produce and transmit the plurality of RF service downlink beams comprises a downlink portion of the Ka band.

7. The subsystem of claim 6, wherein the downlink portion of the Ka band is from 17.7 GHz to 20.2 GHz, and thus, has a bandwidth of 2.5 GHz.

8. The subsystem of claim 6, wherein the downlink portion of the Ka band is from 17.3 GHz to 20.2 GHz, and thus, has a bandwidth of 2.9 GHz.

9. The subsystem of claim 1, wherein the specified optical wavelength range is a contiguous optical wavelength range within an infrared (IR) spectrum.

10. The subsystem of claim 1, wherein the specified optical wavelength range is a non-contiguous optical wavelength range within an infrared (IR) spectrum.

11. A method for enabling a ground based subsystem to produce and transmit an optical feeder uplink beam to a satellite that is configured to receive the optical feeder uplink beam and in dependence thereon produce and transmit a plurality of RF service downlink beams within a specified RF frequency range to service terminals, the method for use by the ground based subsystem comprising:
emitting a plurality of optical signals each having a different peak wavelength that is within a specified optical wavelength range;
electro-optically modulating each of the optical signals with one of a plurality of different data modulated RF carrier signals, each of which has been modulated to carry data for at least one of the plurality of RF service downlink beams, to thereby produce a plurality of optical data signals, each of which carries data for at least one of the plurality of RF service downlink beams and has an RF frequency within the same specified RF frequency range within which the satellite is configured to transmit the plurality of RF service downlink beams;
multiplexing the plurality of optical data signals to thereby produce a wavelength division multiplexed optical signal that includes data for the plurality of RF service downlink beams;
producing an optical feeder uplink beam, in dependence on the wavelength division multiplexed optical signal; and
transmitting the optical feeder uplink beam through free-space to the satellite;
wherein because RF frequencies of the optical data signals produced during the electro-optically modulating are within the same specified RF frequency range within which the satellite is configured to transmit the plurality of RF service downlink beams, there is an elimination of any need for the satellite to perform any frequency conversions when producing the plurality of RF service downlink beams in dependence on the optical feeder uplink beam.

12. The method of claim 11, further comprising:
receiving a plurality of RF carrier signals each of which has a different RF frequency within the same specified RF frequency range within which the satellite is configured to transmit the plurality of RF service downlink beams; and producing the data modulated RF carrier signals, which are electro-optically modulated with the optical signals, in dependence on the plurality of RF carrier signals.

13. The method of claim 11, wherein the specified RF frequency range within which the satellite is configured to produce and transmit the plurality of RF service downlink beams comprises a downlink portion of the Ka band.

14. The method of claim 13, wherein the downlink portion of the Ka band is from 17.7 GHz to 20.2 GHz, and thus, has a bandwidth of 2.5 GHz.

15. The method of claim 13, wherein the downlink portion of the Ka band is from 17.3 GHz to 20.2 GHz, and thus, has a bandwidth of 2.9 GHz.

16. A space based subsystem of a satellite for use in transmitting a plurality of RF service downlink beams within a specified RF frequency range to service terminals, the space based subsystem comprising:
    receiver optics configured to receive an optical feeder uplink beam from a ground based subsystem;
    an optical amplifier optically coupled to the receiver optics and configured to amplify an optical feeder uplink signal that is output from the receiver optics;
    a wavelength-division multiplexing (WDM) demultiplexer optically coupled to the optical amplifier and configured to separate the amplified optical feeder uplink signal, which is output from the optical amplifier, into a plurality of separate optical signals that each have a different peak wavelength; and
    a plurality of photodetectors, each of which converts a different one of the optical signals that are output from the WDM demultiplexer, to a respective electrical data signal having an RF frequency within the same specified RF frequency range within which the space based subsystem is configured to transmit the plurality of RF service downlink beams; and
    RF components and antennas configured to produce and transmit, in dependence on the electrical data signals generated by the plurality of PDs, the plurality of RF service downlink beams within the specified RF frequency range;
    wherein because the RF frequencies of the electrical data signals output by the plurality of photodetectors are within the same specified RF frequency range within which the space based subsystem is configured to transmit the plurality of RF service downlink beams, there is an elimination of any need for the space based subsystem to perform any frequency conversions when producing the plurality of RF service downlink beams in dependence on the optical feeder uplink beam.

17. The subsystem of claim 16, wherein the specified RF frequency range within which the satellite is configured to produce and transmit a plurality of RF service downlink beams comprises a downlink portion of the Ka band.

18. The subsystem of claim 17, wherein the downlink portion of the Ka band is from 17.7 GHz to 20.2 GHz, and thus, has a bandwidth of 2.5 GHz.

19. The subsystem of claim 17, wherein the downlink portion of the Ka band is from 17.3 GHz to 20.2 GHz, and thus, has a bandwidth of 2.9 GHz.

20. The subsystem of claim 16, wherein the specified optical wavelength range is either a contiguous, or a non-contiguous, optical wavelength range within an infrared (IR) spectrum.

21. A method for enabling a space based subsystem of a satellite to produce and transmit a plurality of RF service downlink beams within a specified RF frequency range to service terminals, the method for use by the space based subsystem comprising:
    receiving an optical feeder uplink beam from a ground based subsystem;
    producing, in dependence on the received optical feeder uplink beam, a plurality of separate optical signals that each have a different peak wavelength;
    converting each of the separate optical signals into a respective electrical data signal having an RF frequency within the same specified RF frequency range within which the space based subsystem is configured to transmit the plurality of RF service downlink beams;
    producing, in dependence on the electrical data signals, the plurality of RF service downlink beams within the specified RF frequency range; and
    transmitting the plurality of RF service downlink beams within the specified RF frequency range;
    wherein because the RF frequencies of the electrical data signals resulting from the converting are within the same specified RF frequency range within which the space based subsystem is configured to transmit the plurality of RF service downlink beams, there is an elimination of any need for the space based subsystem to perform any frequency conversions when producing the plurality of RF service downlink beams in dependence on the optical feeder uplink beam.

22. The method of claim 21, wherein the specified RF frequency range within which the satellite is configured to produce and transmit a plurality of RF service downlink beams comprises a downlink portion of the Ka band.

23. The method of claim 22, wherein the downlink portion of the Ka band is from 17.7 GHz to 20.2 GHz, and thus, has a bandwidth of 2.5 GHz.

24. The method of claim 22, wherein the downlink portion of the Ka band is from 17.3 GHz to 20.2 GHz, and thus, has a bandwidth of 2.9 GHz.

25. The method of claim 21, wherein the specified optical wavelength range is either a contiguous, or a non-contiguous, optical wavelength range within an infrared (IR) spectrum.

* * * * *